(12) United States Patent
Chen et al.

(10) Patent No.: US 11,598,934 B2
(45) Date of Patent: Mar. 7, 2023

(54) OPTICAL IMAGING LENS ASSEMBLY INCLUDING SEVEN LENSES OF +−++−+−, +−+−−+−, +−−+−+−, +−−−−+− OR +−+−++− REFRACTIVE POWERS

(71) Applicant: Zhejiang Sunny Optical Co., Ltd, Ningbo (CN)

(72) Inventors: Chen Chen, Ningbo (CN); Kaiyuan Zhang, Ningbo (CN); Biao Xu, Ningbo (CN); Fujian Dai, Ningbo (CN); Liefeng Zhao, Ningbo (CN)

(73) Assignee: Zhejiang Sunny Optical Co., Ltd, Ningbo (CN)

( * ) Notice: Subject to any disclaimer, the term of this patent is extended or adjusted under 35 U.S.C. 154(b) by 299 days.

(21) Appl. No.: 16/989,272

(22) Filed: Aug. 10, 2020

(65) Prior Publication Data
US 2021/0048638 A1 Feb. 18, 2021

(30) Foreign Application Priority Data

Aug. 14, 2019 (CN) .......................... 201910747551.7

(51) Int. Cl.
G02B 13/00 (2006.01)
G02B 9/64 (2006.01)

(52) U.S. Cl.
CPC ........... G02B 13/0045 (2013.01); G02B 9/64 (2013.01)

(58) Field of Classification Search
CPC ............................. G02B 13/0045; G02B 9/64
See application file for complete search history.

(56) References Cited

U.S. PATENT DOCUMENTS

| | | | |
|---|---|---|---|
| 10,114,196 B2 | 10/2018 | Dai et al. | |
| 2019/0243106 A1 | 8/2019 | Xu et al. | |
| 2019/0369361 A1* | 12/2019 | Yoo | G02B 9/64 |
| 2020/0393654 A1* | 12/2020 | Shin | G02B 13/0045 |

OTHER PUBLICATIONS

Communication dated Aug. 11, 2021 by the Indian Patent Office in application No. 202014033653.

* cited by examiner

Primary Examiner — Wen Huang
(74) Attorney, Agent, or Firm — Sughrue Mion, PLLC

(57) ABSTRACT

The present disclosure discloses an optical imaging lens assembly including, sequentially from an object side to an image side along an optical axis, a first lens having positive refractive power; a second lens having negative refractive power; a third lens having refractive power; a fourth lens having refractive power; a fifth lens having refractive power with a convex object-side surface; a sixth lens having positive refractive power with a convex object-side surface a convex image-side surface; and a seventh lens having negative refractive power, wherein a distance TTL along the optical axis from an object-side surface of the first lens to an imaging plane of the optical imaging lens assembly and half of a diagonal length ImgH of an effective pixel area on the imaging plane of the optical imaging lens assembly satisfy ImgH/(TTL/ImgH)>5.0 mm.

18 Claims, 15 Drawing Sheets

OPTICAL IMAGING LENS ASSEMBLY INCLUDING SEVEN LENSES OF +−++−+−, +−+−−+−, +−−+−+−, +−−−−+− OR +−+−++− REFRACTIVE POWERS

CROSS-REFERENCE TO RELATED APPLICATION

This application claims benefit of priority to Chinese Patent Application No. 201910747551.7 filed on Aug. 14, 2019 before the China National Intellectual Property Administration, the entire disclosure of which is incorporated herein by reference in its entity.

TECHNICAL FIELD

The present disclosure relates to the field of optical components, and specifically, relates to an optical imaging lens assembly.

BACKGROUND

In recent years, imaging lens assemblies based on CMOS and CCD have been widely used in various fields. With the continuous improvement of the performance of photosensitive elements, such as CMOS and CCD, and the gradual reduction of the pixel size, higher demands are placed on the optical imaging lens assembly. At the same time, users have higher and higher imaging demands for imaging lens assemblies mounted on, for example, portable electronic products, and the imaging lens assemblies are required to be able to clearly image the scene in various shooting scenarios. How to satisfy the characteristics of large aperture, large imaging plane, and high pixels while satisfying miniaturization is a problem that needs to be solved urgently.

SUMMARY

The present disclosure provides an optical imaging lens assembly that is applicable to portable electronic products and at least solves or partially addresses at least one of the above disadvantages of the prior art.

In one aspect, the present disclosure provides an optical imaging lens assembly which includes, sequentially from an object side to an image side along an optical axis, a first lens having positive refractive power; a second lens having negative refractive power; a third lens having refractive power; a fourth lens having refractive power; a fifth lens having refractive power, and an object-side surface thereof is a convex surface; a sixth lens having positive refractive power, an object-side surface thereof is a convex surface, and an image-side surface thereof is a convex surface; and a seventh lens having negative refractive power.

In one embodiment, a distance TTL along the optical axis from an object-side surface of the first lens to an imaging plane of the optical imaging lens assembly and half of a diagonal length ImgH of an effective pixel area on the imaging plane of the optical imaging lens assembly may satisfy: ImgH/(TTL/ImgH)>5.0 mm.

In one embodiment, a total effective focal length f of the optical imaging lens assembly and half of a maximal field-of-view Semi-FOV of the optical imaging lens assembly may satisfy: 6.0 mm<f*tan(Semi-FOV)<7.0 mm.

In one embodiment, an effective focal length f1 of the first lens, a radius of curvature R1 of an object-side surface of the first lens and a radius of curvature R2 of an image-side surface of the first lens may satisfy: 0.3<f1/(R1+R2)<1.1.

In one embodiment, a total effective focal length f of the optical imaging lens assembly, an effective focal length f6 of the sixth lens and an effective focal length f7 of the seventh lens may satisfy: 0.2<(f6+f7)/f<0.7.

In one embodiment, a radius of curvature R11 of the object-side surface of the sixth lens and a radius of curvature R10 of an image-side surface of the fifth lens may satisfy: 0.3<R11/R10<1.0.

In one embodiment, a spaced interval T56 between the fifth lens and the sixth lens along the optical axis, a center thickness CT6 of the sixth lens along the optical axis, a spaced interval T67 between the sixth lens and the seventh lens along the optical axis, a center thickness CT7 of the seventh lens along the optical axis, and a distance TTL along the optical axis from an object-side surface of the first lens to an imaging plane of the optical imaging lens assembly may satisfy: 1.7<(T56+CT6+T67+CT7)/TTL*5<2.2.

In one embodiment, half of a maximal field-of-view Semi-FOV of the optical imaging lens assembly may satisfy: 40°<Semi-FOV<45°.

In one embodiment, a total effective focal length f of the optical imaging lens assembly, a radius of curvature R3 of an object-side surface of the second lens and a radius of curvature R4 of an image-side surface of the second lens may satisfy: 0.3<f/(R3+R4)<1.0.

In one embodiment, a combined focal length f123 of the first lens, the second lens, and the third lens and a total effective focal length f of the optical imaging lens assembly may satisfy: 0.8<f123/f<1.3.

In one embodiment, an on-axis distance SAG72 from an intersection of an image-side surface of the seventh lens and the optical axis to a vertex of an effective radius of the image-side surface of the seventh lens, and an on-axis distance SAG62 from an intersection of the image-side surface of the sixth lens and the optical axis to a vertex of an effective radius of the image-side surface of the sixth lens may satisfy: 0.8<SAG72/SAG62<1.5.

In one embodiment, SAG51, being an on-axis distance from an intersection of the object-side surface of the fifth lens and the optical axis to a vertex of an effective radius of the object-side surface of the fifth lens, SAG52, being an on-axis distance from an intersection of an image-side surface of the fifth lens and the optical axis to a vertex of an effective radius of the image-side surface of the fifth lens, and a center thickness CT5 of the fifth lens along the optical axis may satisfy: 1.6<|SAG51+SAG52|/CT5<2.6.

In one embodiment, a maximum effective radius DT11 of an object-side surface of the first lens, a maximum effective radius DT21 of an object-side surface of the second lens, a maximum effective radius DT31 of an object-side surface of the third lens, a maximum effective radius DT41 of an object-side surface of the fourth lens, a maximum effective radius DT51 of the object-side surface of the fifth lens, a maximum effective radius DT61 of the object-side surface of the sixth lens and a maximum effective radius DT71 of an object-side surface of the seventh lens may satisfy: 2.3<(DT41+DT51+DT61+DT71)/(DT11+DT21+DT31)<2.8.

The optical imaging lens assembly provided by the present disclosure employs a plurality of lenses, such as the first lens to the seventh lens. By reasonably controlling the relationship between the image height and the total optical length of the optical imaging lens assembly, and optimizing the configuration of the refractive power and surface shape of each lens, the optical imaging lens assembly may achieve the characteristics of large imaging plane, large aperture and high imaging quality while meeting the miniaturization.

BRIEF DESCRIPTION OF THE DRAWINGS

Other features, objects, and advantages of the present disclosure will become more apparent from the following detailed description of the non-limiting embodiments with reference to the accompanying drawings. In the drawings.

DETAILED DESCRIPTION OF EMBODIMENTS

Figure 1:
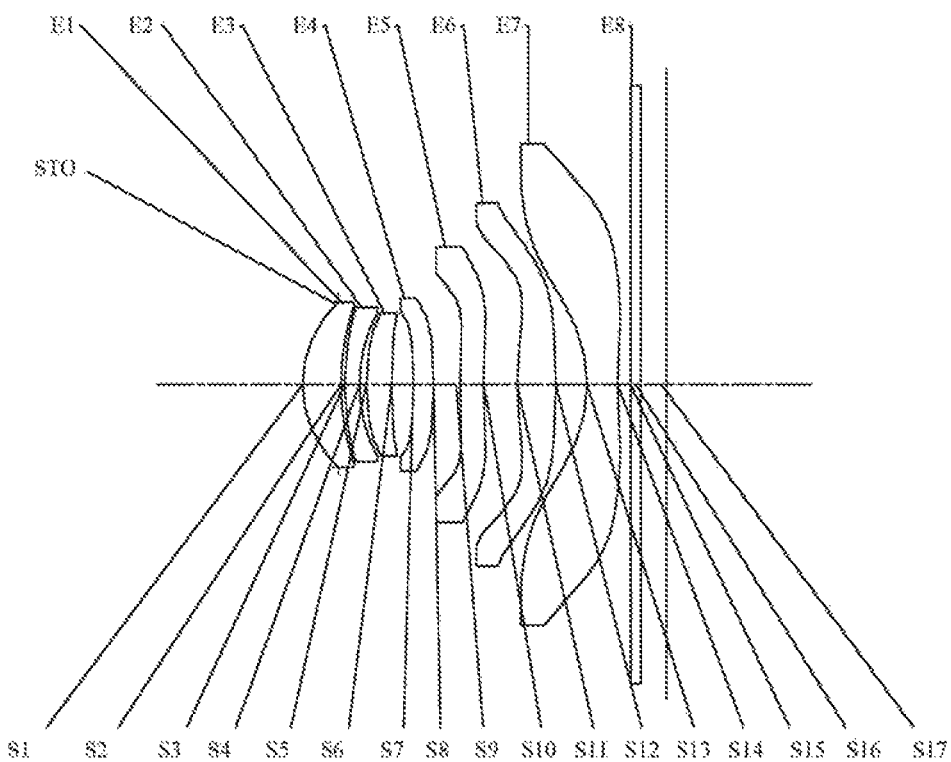
FIG. 1 illustrates a schematic structural view of an optical imaging lens assembly according to Example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include seven lenses having refractive power, which are a first lens, a second lens, a third lens, a fourth lens, a fifth lens, a sixth lens and a seventh lens. The seven lenses are arranged sequentially from an object side to an image side along an optical axis. Among the first lens to the seventh lens, there may be an air interval between each two adjacent lenses.

In an exemplary embodiment, the first lens may have positive refractive power; the second lens may have negative refractive power; the third lens may have positive or negative refractive power; the fourth lens may have positive or negative refractive power; the fifth lens may have positive or negative refractive power, and an object-side surface thereof is a convex surface; the sixth lens may have positive refractive power, an object-side surface thereof is a convex surface, and an image-side surface thereof is a convex surface; and the seventh lens may have negative refractive power. Reasonably configuring the refractive power and surface shape of each lens in the optical system may effectively compensate the low-order aberrations of the optical system and reduce tolerance sensitivity.

In an exemplary embodiment, an object-side surface of the first lens may be a convex surface, and an image-side surface thereof may be a concave surface.

In an exemplary embodiment, an object-side surface of the second lens may be a convex surface, and an image-side surface thereof may be a concave surface.

In an exemplary embodiment, an object-side surface of the third lens may be a convex surface.

In an exemplary embodiment, a distance TTL along the optical axis from an object-side surface of the first lens to an imaging plane of the optical imaging lens assembly and half of a diagonal length ImgH of an effective pixel area on the imaging plane of the optical imaging lens assembly may satisfy: ImgH/(TTL/ImgH)>5.0 mm. For example, 5.0 mm<ImgH/(TTL/ImgH)<6.0 mm. By reasonably controlling the value of the distance along the optical axis from the object-side surface of the first lens to the imaging plane of the optical imaging lens assembly and the half diagonal length of the effective pixel area on the imaging plane of the optical imaging lens assembly and the relationship therebetween, it is beneficial to make the optical imaging lens assembly meet the ultra-thin performance, so as to achieve the miniaturization of the lens assembly.

In an exemplary embodiment, a total effective focal length f of the optical imaging lens assembly and half of a maximal field-of-view Semi-FOV of the optical imaging lens assembly may satisfy: 6.0 mm<f*tan(Semi-FOV)<7.0 mm. For example, 6.0 mm<f*tan(Semi-FOV)<6.5 mm. By reasonably controlling the relationship between the total effective focal length of the optical imaging lens assembly and half the maximal field-of-view of the optical imaging lens assembly, the product of the total effective focal length of the optical imaging lens assembly and the tangent of half the maximal field-of-view of the optical imaging lens assembly is controlled within a reasonable value range, which is beneficial to control the image size and imaging range of the optical system, so that the system has a larger imaging plane.

In an exemplary embodiment, an effective focal length f1 of the first lens, a radius of curvature R1 of an object-side surface of the first lens and a radius of curvature R2 of an image-side surface of the first lens may satisfy: 0.3<f1/(R1+R2)<1.1. Reasonably controlling the relationship among the effective focal length of the first lens, the radius of curvature of the object-side surface of the first lens and the radius of curvature of the image-side surface of the first lens may effectively control the diopter of the incident light on the first lens, which is beneficial to compensate the contribution of the first lens to the fifth-order spherical aberration of the optical system, thereby improving the imaging quality of the optical system.

In an exemplary embodiment, a total effective focal length f of the optical imaging lens assembly, an effective focal length f6 of the sixth lens and an effective focal length f7 of the seventh lens may satisfy: 0.2<(f6+f7)/f<0.7. For example, 0.30<(f6+f7)/f<0.55. Reasonably controlling the relationship among the total effective focal length of the optical imaging lens assembly, the effective focal length of the sixth lens and the effective focal length of the seventh lens may effectively control the contribution of the sixth lens and the seventh lens to the aberration of the entire optical system. The residual aberrations generated by the sixth lens and the seventh lens compensate the aberrations generated by the first lens to the fifth lens to improve the imaging quality of the optical system.

In an exemplary embodiment, a radius of curvature R11 of the object-side surface of the sixth lens and a radius of curvature R10 of an image-side surface of the fifth lens may satisfy: 0.3<R11/R10<1.0. By controlling the ratio of the radius of curvature of the object-side surface of the sixth lens to the radius of curvature of the image-side surface of the fifth lens to be within a reasonable value range, the deflection angle of the edge light of the optical system may be adjusted reasonably, and the sensitivity of the system may be effectively reduced.

In an exemplary embodiment, a spaced interval T56 between the fifth lens and the sixth lens along the optical axis, a center thickness CT6 of the sixth lens along the optical axis, a spaced interval T67 between the sixth lens and the seventh lens along the optical axis, a center thickness CT7 of the seventh lens along the optical axis, and a distance TTL along the optical axis from an object-side surface of the first lens to an imaging plane of the optical imaging lens assembly may satisfy: 1.7<(T56+CT6+T67+CT7)/TTL*5<2.2. By controlling the ratio of the sum of the spaced interval between the fifth lens and the sixth lens along the optical axis, the spaced interval between the sixth lens and the seventh lens along the optical axis, the center thickness of the sixth lens along the optical axis and the center thickness of the seventh lens along the optical axis to the distance along the optical axis from the object-side surface of the first lens to the imaging plane of the optical imaging lens assembly to be within a reasonable value range, that is, by constraining the ratio of the air interval in the front and rear of the sixth lens, the center thickness and the total length of the system, the field curvature contribution of the sixth lens in each field-of-view is controlled within a reasonable range to compensate the field curvature generated by other lenses.

In an exemplary embodiment, half of a maximal field-of-view Semi-FOV of the optical imaging lens assembly may satisfy: 40°<Semi-FOV<45°. For example, 41°<Semi-FOV<44°. By reasonably setting half of a maximal field-of-view of the optical system, the imaging range of the system may be effectively controlled.

In an exemplary embodiment, a total effective focal length f of the optical imaging lens assembly, a radius of curvature R3 of an object-side surface of the second lens and a radius of curvature R4 of an image-side surface of the second lens may satisfy: 0.3<f/(R3+R4)<1.0. By reasonably controlling the relationship among f, R3 and R4, the optical system may better achieve the deflection of the optical path and compensate the high-level spherical aberration generated by the optical system.

In an exemplary embodiment, a combined focal length f123 of the first lens, the second lens, and the third lens and a total effective focal length f of the optical imaging lens assembly may satisfy: 0.8<f123/f<1.3. For example, 0.9<f123/f<1.3. By reasonably controlling the proportional relationship between the combined focal length of the first lens, the second lens, and the third lens and the total effective focal length of the optical imaging lens assembly, it is beneficial to distribute the refractive power of the first lens, the second lens and the third lens to compensate the off-axis aberration of the optical system, thereby improving the system's ability to correct aberrations.

In an exemplary embodiment, an on-axis distance SAG72 from an intersection of an image-side surface of the seventh lens and the optical axis to a vertex of an effective radius of the image-side surface of the seventh lens, and an on-axis distance SAG62 from an intersection of the image-side surface of the sixth lens and the optical axis to a vertex of an effective radius of the image-side surface of the sixth lens may satisfy: 0.8<SAG72/SAG62<1.5. By controlling the ratio of the sagittal height of the image-side surface of the seventh lens to the sagittal height of the image-side surface of the sixth lens to be within a reasonable value range, it is beneficial to ensure that the shape, processing, forming and assembly of the sixth lens and seventh lens of which having larger apertures are at a better level, thereby improving the production yield of the entire optical system.

In an exemplary embodiment, an on-axis distance SAG51 from an intersection of the object-side surface of the fifth lens and the optical axis to a vertex of an effective radius of the object-side surface of the fifth lens, an on-axis distance SAG52 from an intersection of an image-side surface of the fifth lens and the optical axis to a vertex of an effective radius of the image-side surface of the fifth lens, and a center thickness CT5 of the fifth lens along the optical axis may satisfy: 1.6<|SAG51+SAG52|/CT5<2.6. By controlling the ratio of the sum of the sagittal height of the object-side surface of the fifth lens and the sagittal height of the image-side surface of the fifth lens to the center thickness of the fifth lens along the optical axis to be within a reasonable value range, it is beneficial to ensure the processing and shaping of the fifth lens and reduce the sensitivity, thereby improving the imaging quality of the optical system.

In an exemplary embodiment, a maximum effective radius DT11 of an object-side surface of the first lens, a maximum effective radius DT21 of an object-side surface of the second lens, a maximum effective radius DT31 of an object-side surface of the third lens, a maximum effective radius DT41 of an object-side surface of the fourth lens, a maximum effective radius DT51 of the object-side surface of the fifth lens, a maximum effective radius DT61 of the object-side surface of the sixth lens and a maximum effective radius DT71 of an object-side surface of the seventh lens may satisfy: 2.3<(DT41+DT51+DT61+DT71)/(DT11+DT21+DT31)<2.8. By controlling the ratio of the sum of the maximum effective radii of the fourth lens to the seventh lens to the sum of the maximum effective radii of the first lens to the third lens within a reasonable value range, the uniformity of the shape of each lens in the optical system may be effectively controlled and the reliability of assembly of the optical system may be ensured. At the same time, by doing so, the incident light range may also be effectively limited, the poor-quality light at the edge of the system is removed, the off-axis aberrations is reduced, and the lens assembly resolution is effectively improved.

In an exemplary embodiment, the optical imaging lens assembly described above may further include a stop. The stop may be disposed at an appropriate position as needed, for example, between the object side and the first lens. Optionally, the above optical imaging lens assembly may further include an optical filter for correcting the color deviation and/or a protective glass for protecting the photosensitive element located on an imaging plane.

The present disclosure provides an optical imaging lens assembly with the characteristics of large imaging plane, large aperture, ultra-thinness and the like. The optical imaging lens assembly according to the above embodiments of the present disclosure may employ a plurality of lenses, such as seven lenses as described above. By properly configuring the refractive power of each lens, the surface shape, the center thickness of each lens, and spaced intervals along the optical axis between the lenses, the incident light may be effectively converged, the total optical length of the imaging lens assembly may be reduced, and the workability of the imaging lens assembly may be improved, such that the optical imaging lens assembly is more advantageous for production processing.

In an exemplary embodiment, at least one of the surfaces of lenses is aspheric, that is, at least one of the object-side surface of the first lens to the image-side surface of the seventh lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens, the sixth lens and the seventh lens is aspheric. Optionally, the object-side surface and the image-side surface of each of the first lens, the second lens, the third lens, the fourth lens, the fifth lens, the sixth lens and the seventh lens are aspheric.

The present disclosure further provides an imaging apparatus, having a photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking seven lenses as an example, the optical imaging lens assembly is not limited to include seven lenses. The optical imaging lens assembly may also include other numbers of lenses if desired.

Some specific examples of an optical imaging lens assembly applicable to the above embodiment will be further described below with reference to the accompanying drawings.

Example 1

An optical imaging lens assembly according to example 1 of the present disclosure is described below with reference to FIG. 1 to FIG. 2D. FIG. 1 is a schematic structural view of the optical imaging lens assembly according to example 1 of the present disclosure.

As shown in FIG. 1, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 1 is a table illustrating basic parameters of the optical imaging lens assembly of example 1, wherein the units for the radius of curvature, the thickness and the focal length are millimeter (mm).

TABLE 1

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | Infinite | | | | |
| STO | Spherical | Infinite | −0.7351 | | | | |
| S1 | Aspheric | 2.3459 | 0.7892 | 1.55 | 56.1 | 7.48 | 0.1773 |
| S2 | Aspheric | 4.8563 | 0.0745 | | | | 6.4146 |
| S3 | Aspheric | 4.6785 | 0.3100 | 1.67 | 20.4 | −16.25 | 0.2247 |
| S4 | Aspheric | 3.1812 | 0.1401 | | | | 0.0042 |
| S5 | Aspheric | 5.0958 | 0.5250 | 1.55 | 56.1 | 13.82 | 0.3047 |
| S6 | Aspheric | 15.1225 | 0.4421 | | | | 0.0000 |
| S7 | Aspheric | −24.5035 | 0.4177 | 1.67 | 20.4 | 579.44 | 85.9828 |
| S8 | Aspheric | −23.2000 | 0.5518 | | | | −49.2757 |
| S9 | Aspheric | 7.9164 | 0.4800 | 1.65 | 23.5 | −67.92 | −6.2157 |
| S10 | Aspheric | 6.5447 | 0.6743 | | | | −79.3799 |
| S11 | Aspheric | 6.0667 | 0.8004 | 1.55 | 56.1 | 7.21 | −42.0186 |
| S12 | Aspheric | −10.7022 | 0.6437 | | | | 3.5118 |
| S13 | Aspheric | −3.1185 | 0.6300 | 1.54 | 55.7 | −4.02 | −1.0927 |
| S14 | Aspheric | 7.5148 | 0.2672 | | | | −45.4695 |
| S15 | Spherical | Infinite | 0.2100 | 1.52 | 64.2 | | |
| S16 | Spherical | Infinite | 0.5261 | | | | |
| S17 | Spherical | Infinite | | | | | |

In this example, a total effective focal length f of the optical imaging lens assembly satisfies f=6.65 mm, a distance TTL along the optical axis from the object-side surface S1 of the first lens E1 to the imaging plane S17 satisfies TTL=7.48 mm, half of a diagonal length ImgH of an effective pixel area on the imaging plane S17 satisfies ImgH=6.48 mm, and half of a maximal field-of-view Semi-FOV of the optical imaging lens assembly satisfies Semi-FOV=43.8°.

In example 1, the object-side surface and the image-side surface of any one of the first lens E1 to the seventh lens E7 are aspheric. The surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S14 in example 1.

TABLE 2

| Surface number | A4 | A6 | A8 | A10 | A12 |
|---|---|---|---|---|---|
| S1 | −2.1900E−03 | 6.5250E−03 | −1.5430E−02 | 2.1193E−02 | −1.8010E−02 |
| S2 | −1.5060E−02 | 1.3442E−02 | −2.5050E−02 | 3.3774E−02 | −3.4430E−02 |
| S3 | −2.3150E−02 | 1.8774E−02 | −2.5290E−02 | 3.0707E−02 | −2.9380E−02 |
| S4 | −1.2060E−02 | 1.5283E−02 | −1.6650E−02 | 1.7959E−02 | −1.5900E−02 |
| S5 | 7.3440E−03 | −3.6000E−03 | 2.7397E−02 | −5.1490E−02 | 5.5861E−02 |
| S6 | 2.9440E−03 | −1.1330E−02 | 4.6430E−02 | −9.4420E−02 | 1.1681E−01 |
| S7 | −2.9100E−02 | 1.8896E−02 | −5.7250E−02 | 9.6130E−02 | −1.0881E−01 |
| S8 | −3.6810E−02 | 3.2739E−02 | −6.0580E−02 | 7.0497E−02 | −5.4470E−02 |
| S9 | −4.4060E−02 | 2.1033E−02 | −1.4910E−02 | 9.3250E−03 | −4.6700E−03 |
| S10 | −1.3340E−02 | −6.0600E−03 | 7.0130E−03 | −3.5100E−03 | 1.0100E−03 |
| S11 | 1.2614E−02 | −1.3080E−02 | 4.5310E−03 | −1.2500E−03 | 2.3800E−04 |
| S12 | 2.0711E−02 | −9.6100E−03 | 1.9360E−03 | −2.8000E−04 | 2.7700E−05 |
| S13 | −6.8500E−03 | 1.3300E−04 | 5.8600E−04 | −1.1000E−04 | 9.8900E−06 |
| S14 | −1.7520E−02 | 3.4460E−03 | −4.9000E−04 | 5.2600E−05 | −4.4000E−06 |

| Surface number | A14 | A16 | A18 | A20 |
|---|---|---|---|---|
| S1 | 9.4810E−03 | −3.0200E−03 | 5.3000E−04 | −4.0000E−05 |
| S2 | 2.3416E−02 | −9.8400E−03 | 2.3010E−03 | −2.3000E−04 |
| S3 | 1.9654E−02 | −8.2300E−03 | 1.9260E−03 | −1.9000E−04 |
| S4 | 1.0621E−02 | 4.6700E−03 | 1.1840E−03 | −1.3000E−04 |
| S5 | −3.6780E−02 | 1.4590E−02 | −3.2000E−03 | 2.9800E−04 |
| S6 | −8.9080E−02 | 4.1013E−02 | −1.0450E−02 | 1.1350E−03 |
| S7 | 7.8614E−02 | −3.4840E−02 | 8.5880E−03 | −9.0000E−04 |
| S8 | 2.7082E−02 | −8.3000E−03 | 1.4260E−03 | −1.0000E−04 |
| S9 | 1.5570E−03 | −3.2000E−04 | 3.6400E−05 | −1.7000E−06 |
| S10 | −1.8000E−04 | 1.9500E−05 | −1.2000E−06 | 3.1300E−08 |
| S11 | −3.0000E−05 | 2.3600E−06 | −1.1000E−07 | 2.0800E−09 |
| S12 | −1.2000E−06 | −2.2000E−08 | 4.0900E−09 | −1.1000E−10 |
| S13 | −5.1000E−07 | 1.5900E−08 | −2.7000E−10 | 2.0200E−12 |
| S14 | 2.5700E−07 | −9.4000E−09 | 1.9000E−10 | −1.7000E−12 |

Figure 2A:
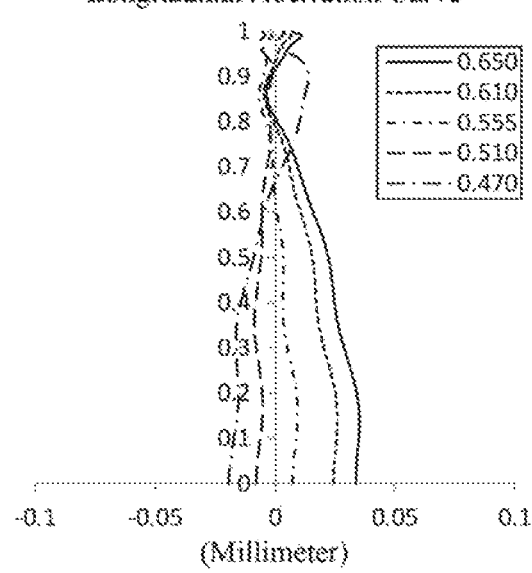
FIGS. 2A to 2D illustrate a longitudinal aberration curve, an astigmatic curve, a distortion curve, and a lateral color curve of the optical imaging lens assembly of the Example 1, respectively.
Figure 2B:
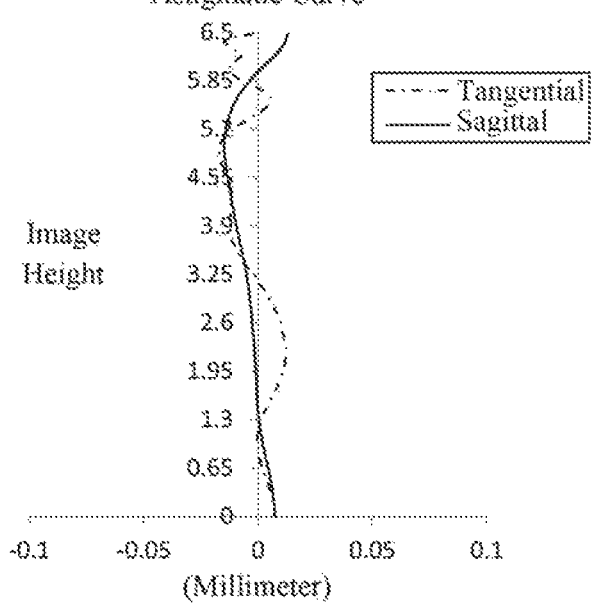
Figure 2C:
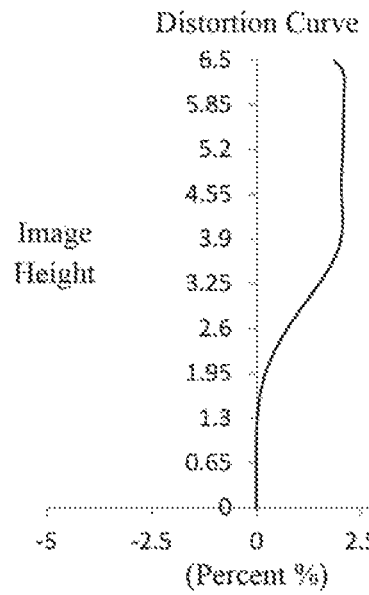
Figure 2D:
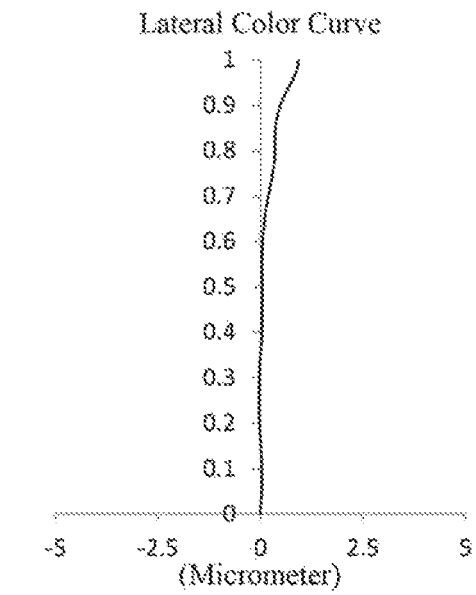

FIG. 2A illustrates a longitudinal aberration curve of the optical imaging lens assembly according to example 1, representing deviations of focal points converged by light of different wavelengths after passing through the lens assembly. FIG. 2B illustrates an astigmatic curve of the optical imaging lens assembly according to example 1, representing a curvature of a tangential plane and a curvature of a sagittal plane. FIG. 2C illustrates a distortion curve of the optical imaging lens assembly according to example 1, representing amounts of distortion corresponding to different image heights. FIG. 2D illustrates a lateral color curve of the optical imaging lens assembly according to example 1, representing deviations of different image heights on an imaging plane after light passes through the lens assembly. It can be seen from FIG. 2A to FIG. 2D that the optical imaging lens assembly provided in example 1 may achieve good image quality.

Example 2

Figure 3:
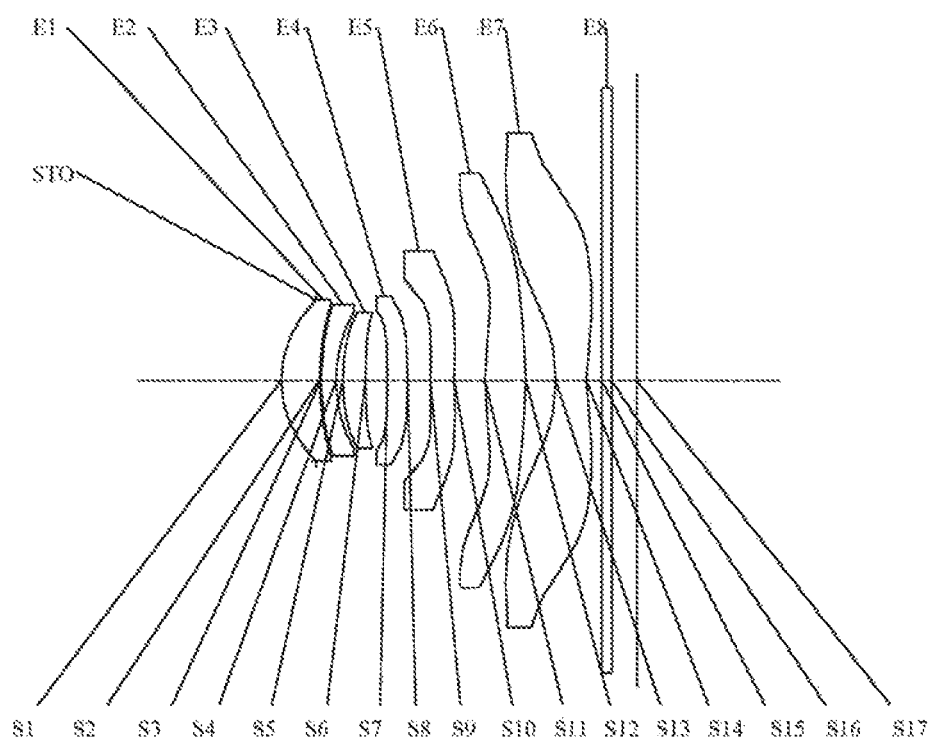
FIG. 3 illustrates a schematic structural view of an optical imaging lens assembly according to Example 2 of the present disclosure.

An optical imaging lens assembly according to example 2 of the present disclosure is described below with reference to FIG. 3 to FIG. 4D. FIG. 3 shows a schematic structural view of the optical imaging lens assembly according to example 2 of the present disclosure.

As shown in FIG. 3, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a concave surface, and an image-side surface S8 thereof is a convex surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens assembly satisfies f=6.65 mm, a distance TTL along the optical axis from the object-side surface S1 of the first lens E1 to the imaging plane S17 satisfies TTL=7.48 mm, half of a diagonal length ImgH of an effective pixel area on the imaging plane S17 satisfies ImgH=6.40 mm, and half of a maximal field-of-view Semi-FOV of the optical imaging lens assembly satisfies Semi-FOV=43.5°.

Table 3 is a table illustrating basic parameters of the optical imaging lens assembly of example 2, wherein the units for the radius of curvature, the thickness and the focal length are millimeter (mm).

TABLE 3

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | Infinite | | | | |
| STO | Spherical | Infinite | −0.7366 | | | | |
| S1 | Aspheric | 2.3315 | 0.8035 | 1.55 | 56.1 | 6.92 | 0.1919 |
| S2 | Aspheric | 5.3455 | 0.0326 | | | | 3.3617 |
| S3 | Aspheric | 4.5155 | 0.3200 | 1.67 | 20.4 | −14.01 | 3.4705 |
| S4 | Aspheric | 2.9583 | 0.1454 | | | | −0.0849 |
| S5 | Aspheric | 4.7085 | 0.4720 | 1.55 | 56.1 | 14.27 | −0.0813 |
| S6 | Aspheric | 11.4816 | 0.4654 | | | | 33.9147 |
| S7 | Aspheric | −36.5168 | 0.4250 | 1.67 | 20.4 | −4627.89 | −57.2562 |
| S8 | Aspheric | −37.1260 | 0.4810 | | | | 98.8531 |
| S9 | Aspheric | 11.9310 | 0.5000 | 1.65 | 23.5 | −48.85 | 6.7184 |
| S10 | Aspheric | 8.5103 | 0.6375 | | | | −17.8545 |
| S11 | Aspheric | 7.0081 | 0.8634 | 1.55 | 56.1 | 6.74 | −19.4972 |
| S12 | Aspheric | −7.4012 | 0.6259 | | | | −24.4780 |
| S13 | Aspheric | −4.4281 | 0.6500 | 1.54 | 55.7 | −3.88 | −1.1011 |
| S14 | Aspheric | 4.1393 | 0.3211 | | | | −21.2995 |
| S15 | Spherical | Infinite | 0.2100 | 1.52 | 64.2 | | |
| S16 | Spherical | Infinite | 0.5302 | | | | |
| S17 | Spherical | Infinite | | | | | |

In example 2, the object-side surface and the image-side surface of any one of the first lens E1 to the seventh lens E7 are aspheric. Table 4 below shows high-order coefficients A4, A6, A8, A10, A12, A14, A16, A18 and A20 applicable to each aspheric surface S1 to S14 in example 2.

TABLE 4

| Surface number | A4 | A6 | A8 | A10 | A12 |
|---|---|---|---|---|---|
| S1 | −2.0300E−03 | 4.5120E−03 | −9.4100E−03 | 1.1638E−02 | −9.2700E−03 |
| S2 | −1.6810E−02 | 3.5239E−02 | −4.9980E−02 | 4.3145E−02 | −2.3190E−02 |
| S3 | −3.2380E−02 | 3.9293E−02 | −5.7750E−02 | 5.6097E−02 | −3.6430E−02 |
| S4 | −1.2220E−02 | 2.3641E−02 | −4.3160E−02 | 5.8018E−02 | −5.0390E−02 |
| S5 | 7.9570E−03 | 1.0870E−03 | 1.9230E−02 | −4.7900E−02 | 6.2967E−02 |
| S6 | −7.1000E−04 | 8.2010E−03 | −1.4960E−02 | 1.8937E−02 | −1.1170E−02 |
| S7 | −2.9630E−02 | 3.0730E−02 | −9.5360E−02 | 1.6783E−01 | −1.9224E−01 |
| S8 | −3.6120E−02 | 3.5166E−02 | −6.8050E−02 | 8.2663E−02 | −6.6490E−02 |
| S9 | −5.0630E−02 | 1.8556E−02 | −1.3180E−02 | 9.6270E−03 | −5.9100E−03 |
| S10 | −4.3840E−02 | 1.1733E−02 | −3.2000E−03 | 1.0230E−03 | −3.4000E−04 |
| S11 | 4.4100E−04 | −3.5600E−03 | 2.3800E−04 | 4.9100E−05 | −9.5000E−06 |
| S12 | 1.4382E−02 | −4.3200E−03 | 5.2800E−04 | −2.4000E−05 | −1.7000E−06 |
| S13 | −3.3950E−02 | 1.2173E−02 | −1.9000E−03 | 1.8000E−04 | −1.1000E−05 |
| S14 | −2.4520E−02 | 5.5230E−03 | −7.7000E−04 | 6.5800E−05 | −3.7000E−06 |

| Surface number | A14 | A16 | A18 | A20 |
|---|---|---|---|---|
| S1 | 4.6830E−03 | −1.4600E−03 | 2.5700E−04 | −2.0000E−05 |
| S2 | 6.9870E−03 | −7.7000E−04 | −1.0000E−04 | 2.3000E−05 |
| S3 | 1.5440E−02 | −3.9700E−03 | 5.5200E−04 | −3.2000E−05 |
| S4 | 2.7831E−02 | −9.2300E−03 | 1.6460E−03 | −1.2000E−04 |
| S5 | −4.8280E−02 | 2.1893E−02 | −5.4300E−03 | 5.6700E−04 |
| S6 | 4.7500E−04 | 3.3040E−03 | −1.7100E−03 | 2.8300E−04 |
| S7 | 1.3924E−01 | −6.1670E−02 | 1.5205E−02 | −1.6000E−03 |
| S8 | 3.4159E−02 | −1.0770E−02 | 1.8950E−03 | −1.4000E−04 |
| S9 | 2.3820E−03 | −5.9000E−04 | 8.2500E−05 | 4.8000E−06 |
| S10 | 7.7300E−05 | −1.0000E−05 | 6.7800E−07 | −1.8000E−08 |
| S11 | 7.7300E−07 | −3.6000E−08 | 9.5900E−10 | −1.1000E−11 |
| S12 | 3.1100E−07 | −2.0000E−08 | 6.1900E−10 | −8.0000E−12 |
| S13 | 4.5700E−07 | −1.2000E−08 | 1.8200E−10 | −1.2000E−12 |
| S14 | 1.3200E−07 | −2.8000E−09 | 2.9800E−11 | −9.6000E−14 |

Figure 4A:
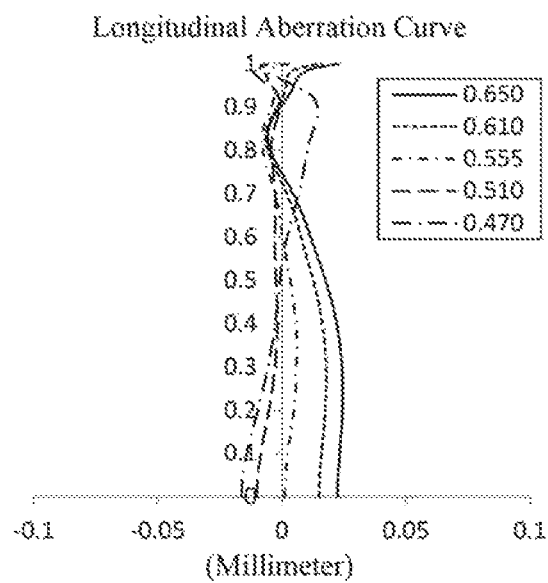
FIGS. 4A to 4D illustrate a longitudinal aberration curve, an astigmatic curve, a distortion curve, and a lateral color curve of the optical imaging lens assembly of the Example 2, respectively.
Figure 4B:
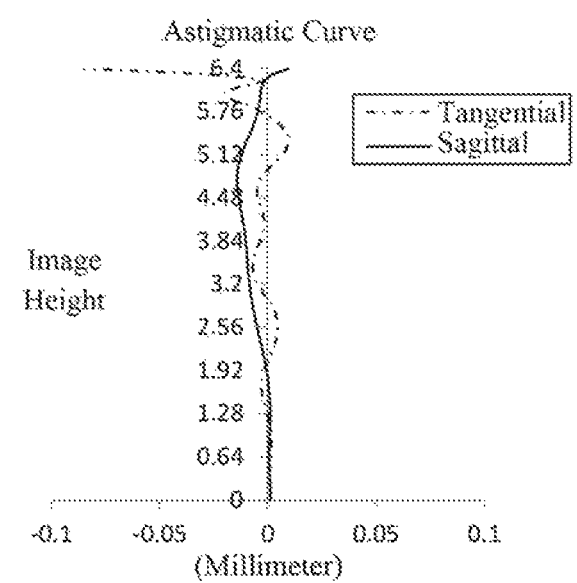
Figure 4C:
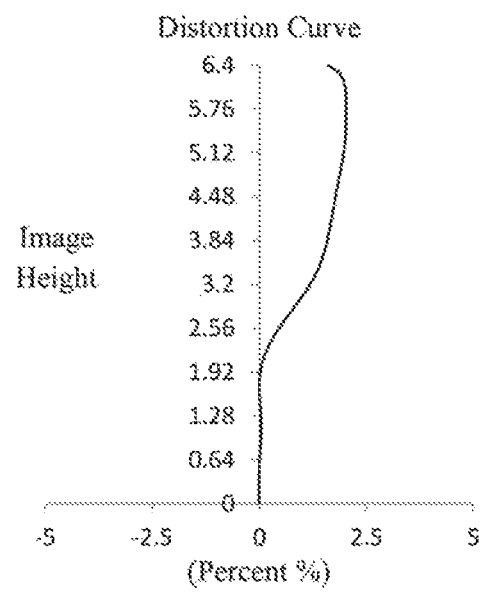
Figure 4D:
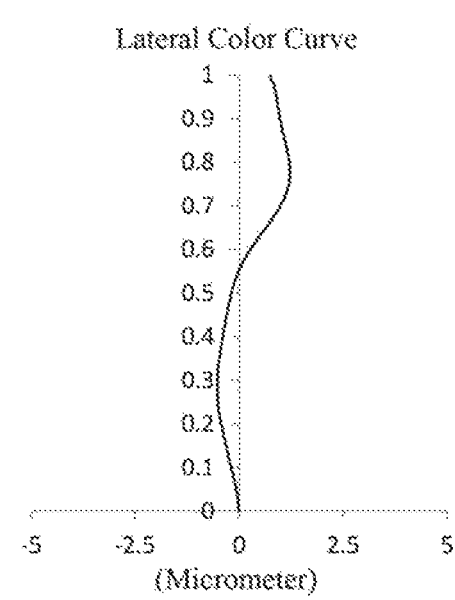

FIG. 4A illustrates a longitudinal aberration curve of the optical imaging lens assembly according to example 2, representing deviations of focal points converged by light of different wavelengths after passing through the lens assembly. FIG. 4B illustrates an astigmatic curve of the optical imaging lens assembly according to example 2, representing a curvature of a tangential plane and a curvature of a sagittal plane. FIG. 4C illustrates a distortion curve of the optical imaging lens assembly according to example 2, representing amounts of distortion corresponding to different image heights. FIG. 4D illustrates a lateral color curve of the optical imaging lens assembly according to example 2, representing deviations of different image heights on an imaging plane after light passes through the lens assembly. It can be seen from FIG. 4A to FIG. 4D that the optical imaging lens assembly provided in example 2 may achieve a good image quality.

Example 3

Figure 5:
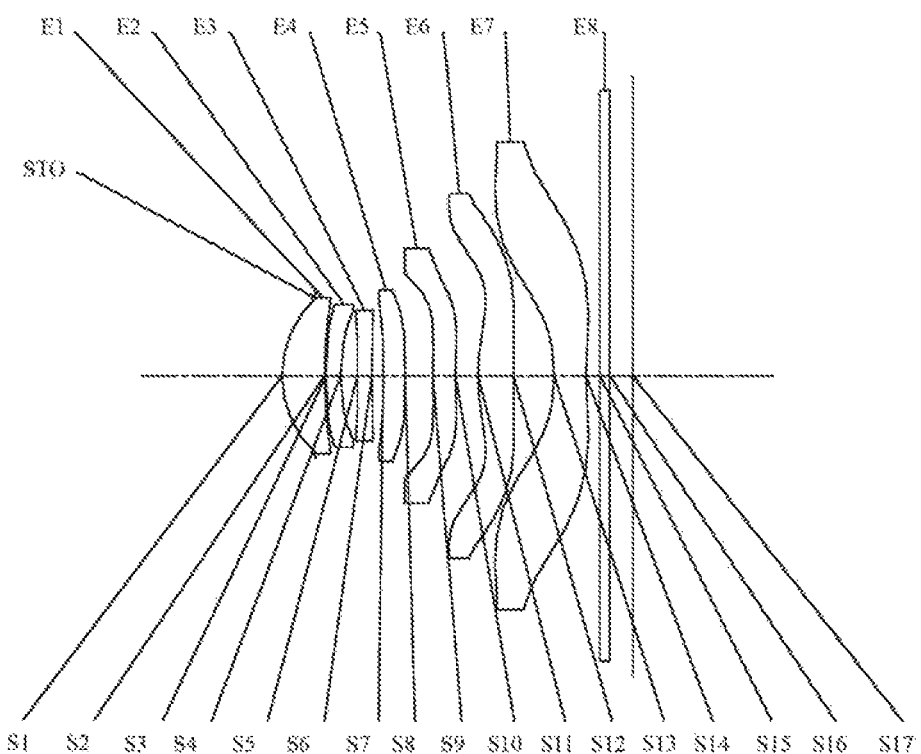
FIG. 5 illustrates a schematic structural view of an optical imaging lens assembly according to Example 3 of the present disclosure.

An optical imaging lens assembly according to example 3 of the present disclosure is described below with reference to FIG. 5 to FIG. 6D. FIG. 5 shows a schematic structural view of the optical imaging lens assembly according to example 3 of the present disclosure.

As shown in FIG. 5, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has negative refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens assembly satisfies f=6.63 mm, a distance TTL along the optical axis from the object-side surface S1 of the first lens E1 to the imaging plane S17 satisfies TTL=7.50 mm, half of a diagonal length ImgH of an effective pixel area on the imaging plane S17 satisfies ImgH=6.35 mm, and half of a maximal field-of-view Semi-FOV of the optical imaging lens assembly satisfies Semi-FOV=43.3°.

Table 5 is a table illustrating basic parameters of the optical imaging lens assembly of example 3, wherein the units for the radius of curvature, the thickness and the focal length are millimeter (mm).

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7151 | | | | |
| S1 | Aspheric | 2.3295 | 0.9125 | 1.55 | 56.1 | 5.21 | 0.0341 |
| S2 | Aspheric | 11.0849 | 0.0331 | | | | 4.5142 |
| S3 | Aspheric | 8.9971 | 0.3100 | 1.68 | 19.2 | −12.90 | 16.7345 |
| S4 | Aspheric | 4.3726 | 0.3615 | | | | 2.8238 |
| S5 | Aspheric | 59.0376 | 0.3100 | 1.68 | 19.2 | −163.39 | 99.0000 |
| S6 | Aspheric | 38.4232 | 0.2371 | | | | −99.0000 |
| S7 | Aspheric | 40.0039 | 0.4718 | 1.55 | 56.1 | 57.14 | −81.2473 |
| S8 | Aspheric | −141.0910 | 0.5947 | | | | 99.0000 |
| S9 | Aspheric | 11.0057 | 0.4700 | 1.57 | 37.3 | −38.77 | −20.4879 |
| S10 | Aspheric | 7.2344 | 0.4827 | | | | −29.1902 |
| S11 | Aspheric | 4.4326 | 0.7613 | 1.55 | 56.1 | 7.28 | 0.0445 |
| S12 | Aspheric | −36.2233 | 0.8710 | | | | −64.8660 |
| S13 | Aspheric | −3.9719 | 0.6800 | 1.54 | 55.7 | −4.51 | −1.0013 |
| S14 | Aspheric | 6.5641 | 0.2978 | | | | −41.0929 |
| S15 | Spherical | Infinite | 0.2100 | 1.52 | 64.2 | | |
| S16 | Spherical | Infinite | 0.4965 | | | | |
| S17 | Spherical | Infinite | | | | | |

In example 3, the object-side surface and the image-side surface of any one of the first lens E1 to the seventh lens E7 are aspheric. Table 6 below shows high-order coefficients A4, A6, A8, A10, A12, A14, A16, A18 and A20 applicable to each aspheric surface S1 to S14 in example 3.

TABLE 6

| Surface number | A4 | A6 | A8 | A10 | A12 |
|---|---|---|---|---|---|
| S1 | −8.5000E−04 | 5.8190E−03 | −1.0970E−02 | 1.3712E−02 | −1.0980E−02 |
| S2 | −6.7000E−03 | 5.4700E−05 | 2.0437E−02 | −3.5360E−02 | 3.1864E−02 |
| S3 | −8.7500E−03 | 3.9390E−03 | 1.1375E−02 | −1.9410E−02 | 1.4815E−02 |
| S4 | 3.1300E−04 | −6.3000E−03 | 3.4322E−02 | −7.7510E−02 | 1.0425E−01 |
| S5 | −1.3640E−02 | −7.0000E−04 | 1.7200E−03 | −1.0510E−02 | 2.1633E−02 |
| S6 | −1.3890E−02 | 5.8910E−03 | −6.6700E−03 | 6.9000E−03 | −2.1200E−03 |
| S7 | −2.5420E−02 | 6.1750E−03 | −6.8500E−03 | 4.8900E−04 | 5.9670E−03 |
| S8 | −2.8100E−02 | 9.7430E−03 | −1.3510E−02 | 1.1947E−02 | −8.2600E−03 |
| S9 | −4.6770E−02 | 9.6670E−03 | 1.4960E−03 | −3.8700E−03 | 1.5330E−03 |
| S10 | −5.1580E−02 | 8.2060E−03 | 1.3620E−03 | −1.6300E−03 | 4.6000E−04 |
| S11 | −1.0510E−02 | −7.4600E−03 | 2.3090E−03 | −5.6000E−04 | 9.3700E−05 |
| S12 | 2.4527E−02 | −1.0810E−02 | 1.5690E−03 | −4.0000E−05 | −2.2000E−05 |
| S13 | −2.3140E−02 | 2.7430E−03 | 4.9700E−04 | −1.3000E−04 | 1.2200E−05 |
| S14 | −1.8020E−02 | 1.2050E−03 | 2.2100E−04 | −6.0000E−05 | 6.2000E−06 |

| Surface number | A14 | A16 | A18 | A20 |
|---|---|---|---|---|
| S1 | 5.6460E−03 | −1.8100E−03 | 3.2900E−04 | −2.6142E−05 |
| S2 | −1.7290E−02 | 5.6720E−03 | −1.0300E−03 | 7.9843E−05 |
| S3 | −5.8500E−03 | 1.0960E−03 | −3.1000E−05 | −1.2422E−05 |
| S4 | −8.6500E−02 | 4.3629E−02 | −1.2230E−02 | 1.4678E−03 |
| S5 | −2.3130E−02 | 1.4065E−02 | −4.5600E−03 | 6.1403E−04 |
| S6 | −1.2600E−03 | 1.7210E−03 | −6.9000E−04 | 9.6779E−05 |
| S7 | −6.2000E−03 | 3.0030E−03 | −7.1000E−04 | 6.5751E−05 |
| S8 | 4.0400E−03 | −1.2700E−03 | 2.2700E−04 | −1.7256E−05 |
| S9 | −1.9000E−04 | −3.4000E−05 | 1.2500E−05 | −9.9500E−07 |
| S10 | −4.8000E−05 | −5.1000E−07 | 4.1200E−07 | −2.0283E−08 |
| S11 | −9.3000E−06 | 5.2000E−07 | −1.5000E−08 | 1.7775E−10 |
| S12 | 3.8300E−06 | −3.0000E−07 | 1.2000E−08 | −1.9255E−10 |
| S13 | −6.4000E−07 | 1.9600E−08 | −3.3000E−10 | 2.3178E−12 |
| S14 | −3.5000E−07 | 1.1500E−08 | −2.0000E−10 | 1.5334E−12 |

Figure 6A:
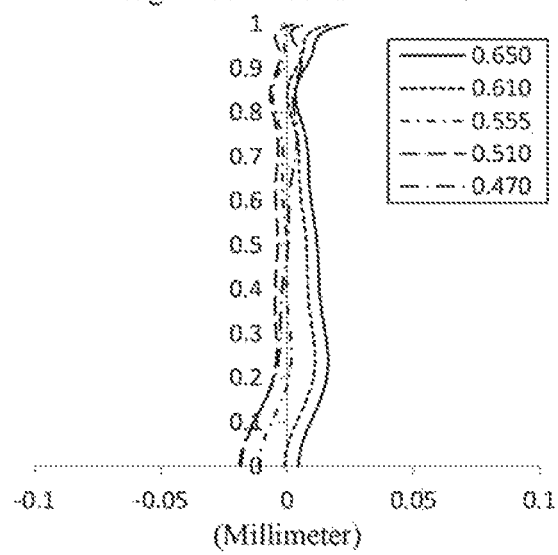
FIGS. 6A to 6D illustrate a longitudinal aberration curve, an astigmatic curve, a distortion curve, and a lateral color curve of the optical imaging lens assembly of the Example 3, respectively.
Figure 6B:
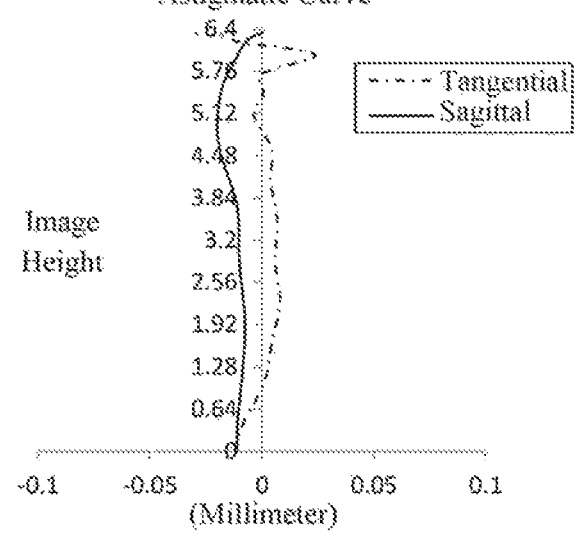
Figures 6C, 6D:
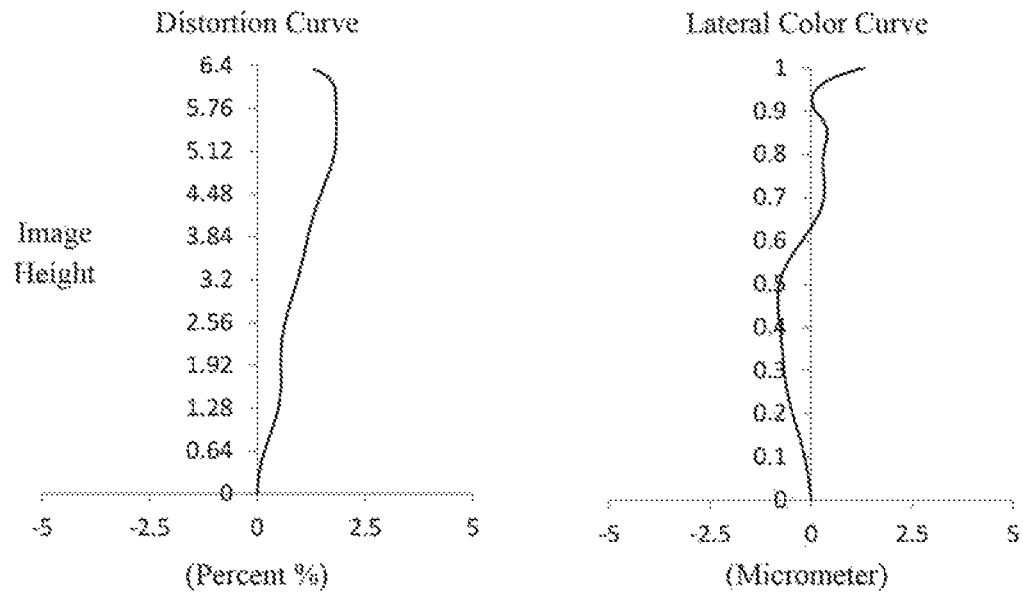

FIG. 6A illustrates a longitudinal aberration curve of the optical imaging lens assembly according to example 3, representing deviations of focal points converged by light of different wavelengths after passing through the lens assembly. FIG. 6B illustrates an astigmatic curve of the optical imaging lens assembly according to example 3, representing a curvature of a tangential plane and a curvature of a sagittal plane. FIG. 6C illustrates a distortion curve of the optical imaging lens assembly according to example 3, representing amounts of distortion corresponding to different image heights. FIG. 6D illustrates a lateral color curve of the optical imaging lens assembly according to example 3, representing deviations of different image heights on an imaging plane after light passes through the lens assembly. It can be seen from FIG. 6A to FIG. 6D that the optical imaging lens assembly provided in example 3 may achieve good image quality.

Example 4

Figure 7:
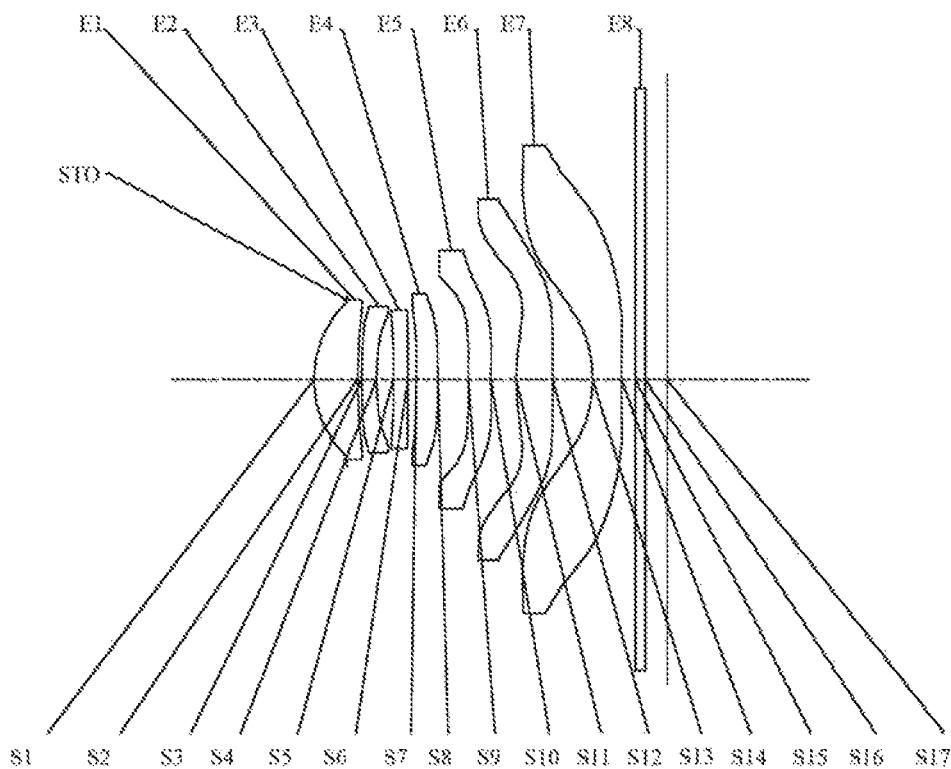
FIG. 7 illustrates a schematic structural view of an optical imaging lens assembly according to Example 4 of the present disclosure.

An optical imaging lens assembly according to example 4 of the present disclosure is described below with reference to FIG. 7 to FIG. 8D. FIG. 7 shows a schematic structural view of the optical imaging lens assembly according to example 4 of the present disclosure.

As shown in FIG. 7, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has negative refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a concave surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens assembly satisfies f=6.65 mm, a distance TTL along the optical axis from the object-side surface S1 of the first lens E1 to the imaging plane S17 satisfies TTL=7.48 mm, half of a diagonal length ImgH of an effective pixel area on the imaging plane S17 satisfies ImgH=6.38 mm, and half of a maximal field-of-view Semi-FOV of the optical imaging lens assembly satisfies Semi-FOV=43.4°.

Table 7 is a table illustrating basic parameters of the optical imaging lens assembly of example 4, wherein the units for the radius of curvature, the thickness and the focal length are millimeter (mm).

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7086 | | | | |
| S1 | Aspheric | 2.3243 | 0.9284 | 1.55 | 56.1 | 5.47 | −0.0533 |
| S2 | Aspheric | 9.0273 | 0.0888 | | | | −21.2127 |
| S3 | Aspheric | 13.5085 | 0.3100 | 1.68 | 19.2 | −14.21 | 30.8471 |
| S4 | Aspheric | 5.5687 | 0.3603 | | | | 4.8259 |
| S5 | Aspheric | 37.1559 | 0.3100 | 1.68 | 19.2 | −183.82 | −63.3918 |
| S6 | Aspheric | 28.5223 | 0.1770 | | | | −82.7790 |
| S7 | Aspheric | 21.3799 | 0.4600 | 1.55 | 56.1 | 42.33 | −96.1486 |
| S8 | Aspheric | 283.5504 | 0.6414 | | | | 84.6167 |
| S9 | Aspheric | 17.7427 | 0.4800 | 1.57 | 37.3 | −71.57 | −14.4198 |
| S10 | Aspheric | 12.2459 | 0.5226 | | | | −28.7632 |
| S11 | Aspheric | 4.5336 | 0.7705 | 1.55 | 56.1 | 7.83 | 0.0671 |
| S12 | Aspheric | −70.1796 | 0.8514 | | | | 99.0000 |
| S13 | Aspheric | −2.9548 | 0.6100 | 1.54 | 55.7 | −4.29 | −1.4836 |
| S14 | Aspheric | 11.2339 | 0.2941 | | | | −25.2182 |
| S15 | Spherical | Infinite | 0.2100 | 1.52 | 64.2 | | |
| S16 | Spherical | Infinite | 0.4656 | | | | |
| S17 | Spherical | Infinite | | | | | |

In example 4, the object-side surface and the image-side surface of any one of the first lens E1 to the seventh lens E7 are aspheric. Table 8 below shows high-order coefficients A4, A6, A8, A10, A12, A14, A16, A18 and A20 applicable to each aspheric surface S1 to S14 in example 4.

Figure 8A:
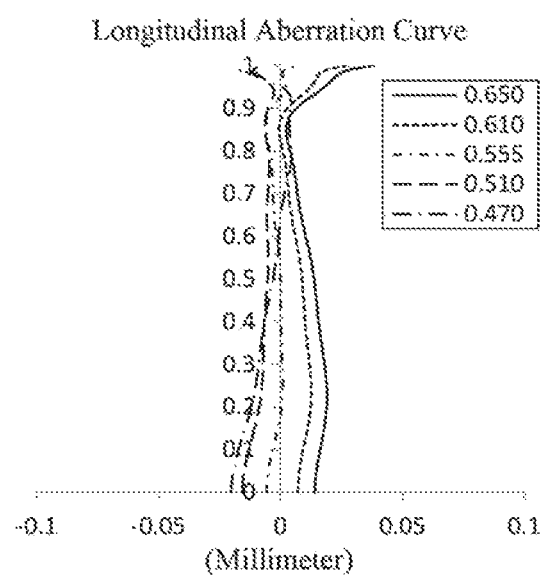
FIGS. 8A to 8D illustrate a longitudinal aberration curve, an astigmatic curve, a distortion curve, and a lateral color curve of the optical imaging lens assembly of the Example 4, respectively.
Figure 8B:
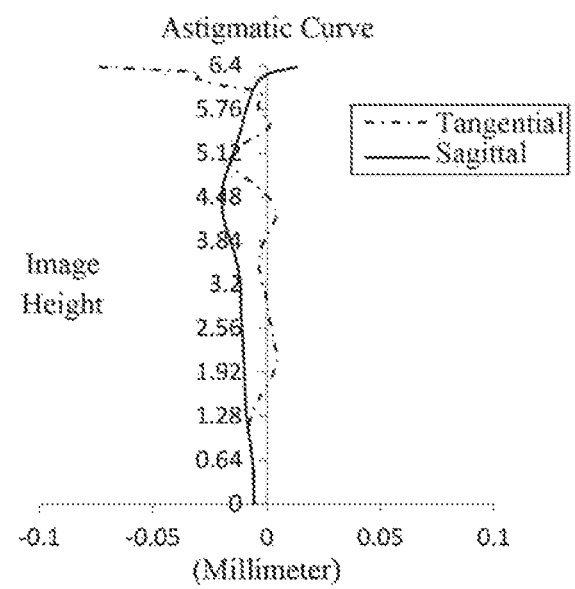
Figure 8C:
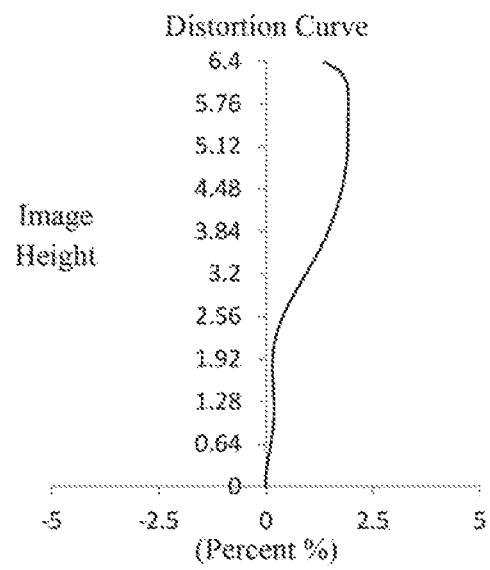
Figure 8D:
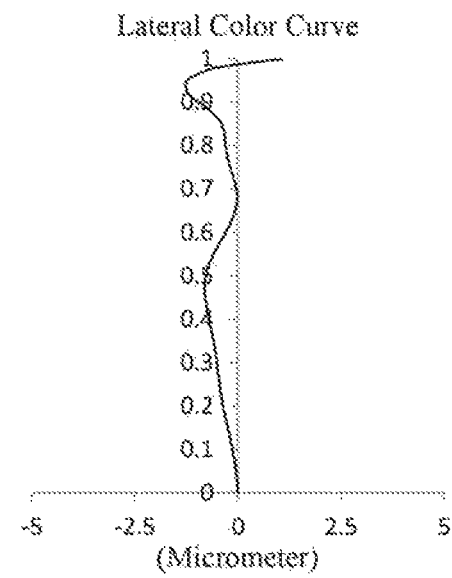

FIG. 8A illustrates a longitudinal aberration curve of the optical imaging lens assembly according to example 4, representing deviations of focal points converged by light of different wavelengths after passing through the lens assembly. FIG. 8B illustrates an astigmatic curve of the optical imaging lens assembly according to example 4, representing a curvature of a tangential plane and a curvature of a sagittal plane. FIG. 8C illustrates a distortion curve of the optical imaging lens assembly according to example 4, representing

TABLE 8

| Surface number | A4 | A6 | A8 | A10 | A12 |
|---|---|---|---|---|---|
| S1 | 2.1700E−04 | 3.6630E−03 | −5.5000E−03 | 5.7180E−03 | −3.7488E−03 |
| S2 | −1.1670E−02 | 5.2930E−03 | 8.1540E−03 | −1.6640E−02 | 1.5401E−02 |
| S3 | −1.6340E−02 | 1.8639E−02 | −6.1400E−03 | 6.8600E−04 | −8.5322E−04 |
| S4 | −1.8800E−03 | 1.2876E−02 | −5.1000E−04 | −1.1010E−02 | 1.6850E−02 |
| S5 | −2.0680E−02 | 6.4270E−03 | −1.7900E−03 | −1.6690E−02 | 3.4031E−02 |
| S6 | −2.6960E−02 | 1.6263E−02 | −1.3170E−02 | 2.1390E−02 | 1.0387E−02 |
| S7 | −3.4690E−02 | 6.0700E−03 | 1.0120E−02 | −3.1720E−02 | 3.8220E−02 |
| S8 | −3.0660E−02 | 1.1282E−02 | −1.7740E−02 | 1.9210E−02 | −1.4952E−02 |
| S9 | −3.7630E−02 | 2.3740E−03 | 4.8910E−03 | −4.4700E−03 | 1.2266E−03 |
| S10 | 4.8120E−02 | 3.6340E−03 | 4.8910E−03 | −3.4400E−03 | 1.0410E−03 |
| S11 | −1.3580E−02 | −1.1790E−02 | 5.5400E−03 | −1.7000E−03 | 3.1843E−04 |
| S12 | 1.9937E−02 | −1.7030E−02 | 5.1130E−03 | −1.0600E−03 | 1.5601E−04 |
| S13 | −1.8390E−02 | −1.0000E−03 | 1.6910E−03 | −3.2000E−04 | 3.0785E−05 |
| S14 | −2.6640E−02 | 3.8980E−03 | −1.2000E−04 | −4.1000E−05 | 6.3909E−06 |

| Surface number | A14 | A16 | A18 | A20 |
|---|---|---|---|---|
| S1 | 1.5320E−03 | −3.8000E−04 | 5.1600E−05 | −3.1531E−06 |
| S2 | −8.7000E−03 | 3.0000E−03 | −5.7000E−04 | 4.6068E−05 |
| S3 | 1.5260E−03 | −8.6000E−04 | 2.2400E−04 | −2.2691E−05 |
| S4 | −1.3900E−02 | 7.0590E−03 | −2.0000E−03 | 2.4541E−04 |
| S5 | −3.3040E−02 | 1.7728E−02 | −5.0000E−03 | 5.7795E−04 |
| S6 | −1.2570E−02 | 6.9230E−03 | −1.8800E−03 | 2.0141E−04 |
| S7 | −2.5380E−02 | 9.7160E−03 | −1.9800E−03 | 1.6494E−04 |
| S8 | 7.6700E−03 | −2.4300E−03 | 4.2800E−04 | −3.1736E−05 |
| S9 | 4.0800E−05 | −9.6000E−05 | 1.9900E−05 | −1.3309E−06 |
| S10 | −1.6000E−04 | 1.1800E−05 | −3.3000E−07 | −1.7683E−09 |
| S11 | −3.5000E−05 | 2.1700E−06 | −7.3000E−08 | 1.0091E−09 |
| S12 | −1.5000E−05 | 8.6700E−07 | −2.8000E−08 | 3.7167E−10 |
| S13 | −1.7000E−06 | 5.8300E−08 | −1.1000E−09 | 8.8962E−12 |
| S14 | −4.5000E−07 | 1.7800E−08 | −3.7000E−10 | 3.2448E−12 | amounts of distortion corresponding to different image heights. FIG. 8D illustrates a lateral color curve of the optical imaging lens assembly according to example 4, representing deviations of different image heights on an imaging plane after light passes through the lens assembly. It can be seen from FIG. 8A to FIG. 8D that the optical imaging lens assembly provided in example 4 may achieve good image quality.

Example 5

Figure 9:
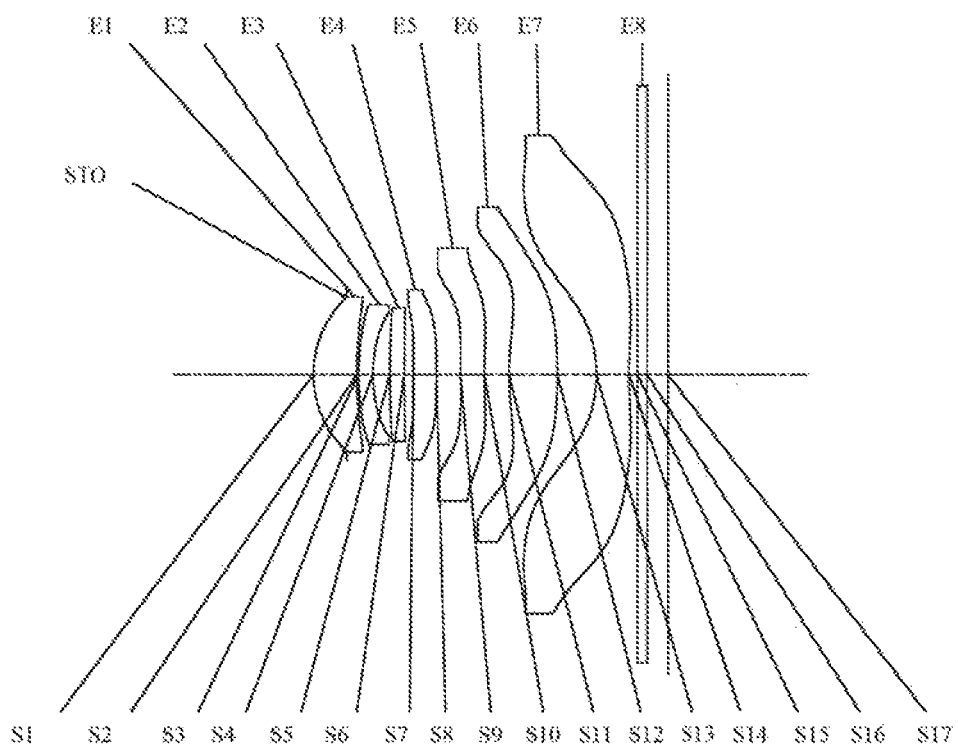
FIG. 9 illustrates a schematic structural view of an optical imaging lens assembly according to Example 5 of the present disclosure.

An optical imaging lens assembly according to example 5 of the present disclosure is described below with reference to FIG. 9 to FIG. 10D. FIG. 9 shows a schematic structural view of the optical imaging lens assembly according to example 5 of the present disclosure.

As shown in FIG. 9, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens assembly satisfies f=6.62 mm, a distance TTL along the optical axis from the object-side surface S1 of the first lens E1 to the imaging plane S17 satisfies TTL=7.61 mm, half of a diagonal length ImgH of an effective pixel area on the imaging plane S17 satisfies ImgH=6.25 mm, and half of a maximal field-of-view Semi-FOV of the optical imaging lens assembly satisfies Semi-FOV=42.8°.

Table 9 is a table illustrating basic parameters of the optical imaging lens assembly of example 5, wherein the units for the radius of curvature, the thickness and the focal length are millimeter (mm).

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7151 | | | | |
| S1 | Aspheric | 2.3174 | 0.9364 | 1.55 | 56.1 | 5.19 | 0.0263 |
| S2 | Aspheric | 10.9122 | 0.0350 | | | | 10.3469 |
| S3 | Aspheric | 5.9148 | 0.3100 | 1.68 | 19.2 | −10.79 | 9.7151 |
| S4 | Aspheric | 3.2000 | 0.3626 | | | | 2.3987 |
| S5 | Aspheric | 13.8233 | 0.3100 | 1.68 | 19.2 | 74.66 | 90.9503 |
| S6 | Aspheric | 18.8484 | 0.1978 | | | | −99.0000 |
| S7 | Aspheric | 91.6703 | 0.4959 | 1.55 | 56.1 | 41.26 | −38.9435 |
| S8 | Aspheric | −29.8027 | 0.5164 | | | | 79.3889 |
| S9 | Aspheric | 19.1537 | 0.5123 | 1.65 | 23.5 | −20.48 | 59.6527 |
| S10 | Aspheric | 7.7338 | 0.5163 | | | | −1.7482 |
| S11 | Aspheric | 5.3789 | 1.0456 | 1.55 | 56.1 | 6.48 | 0.3838 |
| S12 | Aspheric | −9.6233 | 0.8366 | | | | −9.1234 |
| S13 | Aspheric | −3.0673 | 0.7016 | 1.54 | 55.7 | −4.18 | −1.1463 |
| S14 | Aspheric | 8.9859 | 0.1797 | | | | −28.1695 |
| S15 | Spherical | Infinite | 0.2100 | 1.52 | 64.2 | | |
| S16 | Spherical | Infinite | 0.4463 | | | | |
| S17 | Spherical | Infinite | | | | | |

In example 5, the object-side surface and the image-side surface of any one of the first lens E1 to the seventh lens E7 are aspheric. Table 10 below shows high-order coefficients A4, A6, A8, A10, A12, A14, A16, A18 and A20 applicable to each aspheric surface S1 to S14 in example 5.

TABLE 10

| Surface number | A4 | A6 | A8 | A10 | A12 |
|---|---|---|---|---|---|
| S1 | −1.2400E−03 | 7.3050E−03 | −1.3670E−02 | 1.6459E−02 | −1.2810E−02 |
| S2 | −3.0600E−03 | −1.7000E−04 | 2.3119E−02 | −4.9250E−02 | 5.2100E−02 |
| S3 | −1.2930E−02 | 9.4700E−04 | 3.0118E−02 | −6.6130E−02 | 7.3832E−02 |
| S4 | −8.4200E−03 | −1.7400E−03 | 3.3134E−02 | −8.7210E−02 | 1.3230E−01 |
| S5 | −1.5330E−02 | 5.7230E−03 | −3.1590E−02 | 7.1237E−02 | −9.2540E−02 |

TABLE 10-continued

| S6  | −1.1270E−02 | −1.1080E−02 | 3.8446E−02  | −8.3730E−02 | 1.1228E−01  |
| S7  | −1.8910E−02 | −2.3320E−02 | 5.9638E−02  | −1.0934E−01 | 1.2169E−01  |
| S8  | −2.3030E−02 | −1.4800E−03 | 4.7330E−03  | −1.0280E−02 | 8.5400E−03  |
| S9  | −5.1040E−02 | 1.9679E−02  | −1.0460E−02 | 3.5980E−03  | −1.0100E−03 |
| S10 | −6.0070E−02 | 2.2206E−02  | −7.8300E−03 | 1.9910E−03  | −3.9000E−04 |
| S11 | −2.6150E−02 | −5.9000E−04 | 1.7110E−03  | −8.0000E−04 | 1.9900E−04  |
| S12 | −9.1000E−04 | −5.9400E−03 | 1.7180E−03  | −2.7000E−04 | 2.6000E−05  |
| S13 | −2.3440E−02 | 2.5710E−03  | 6.2900E−04  | −1.5000E−04 | 1.5000E−05  |
| S14 | −2.2130E−02 | 3.6690E−03  | −3.0000E−04 | 5.4900E−06  | 1.0800E−06  |

| Surface number | A14 | A16 | A18 | A20 |
|---|---|---|---|---|
| S1  | 6.4080E−03  | −1.9900E−03 | 3.5100E−04  | −2.7000E−05 |
| S2  | −3.2200E−02 | 1.1754E−02  | −2.3500E−03 | 1.9800E−04  |
| S3  | −4.8470E−02 | 1.8875E−02  | 4.0300E−03  | 3.6400E−04  |
| S4  | −1.2132E−01 | 6.6837E−02  | −2.0310E−02 | 2.6310E−03  |
| S5  | 7.1662E−02  | −3.2300E−02 | 7.7710E−03  | −7.7000E−04 |
| S6  | −9.1440E−02 | 4.4544E−02  | −1.1810E−02 | 1.3010E−03  |
| S7  | −8.3010E−02 | 3.3995E−02  | −7.5600E−03 | 6.9400E−04  |
| S8  | −3.7600E−03 | 9.1000E−04  | −1.0000E−04 | 2.9300E−06  |
| S9  | 1.9400E−04  | −1.3000E−05 | −1.1000E−06 | 1.3400E−07  |
| S10 | 6.6300E−05  | −8.3000E−06 | 5.9700E−07  | −1.8000E−08 |
| S11 | −3.0000E−05 | 2.6800E−06  | −1.3000E−07 | 2.8400E−09  |
| S12 | −1.2000E−06 | −1.3000E−08 | 3.5100E−09  | −9.5000E−11 |
| S13 | −8.2000E−07 | 2.6400E−08  | 4.7000E−10  | 3.5800E−12  |
| S14 | −1.1000E−07 | 4.5500E−09  | −9.6000E−11 | 8.1100E−13  |

Figure 10A:
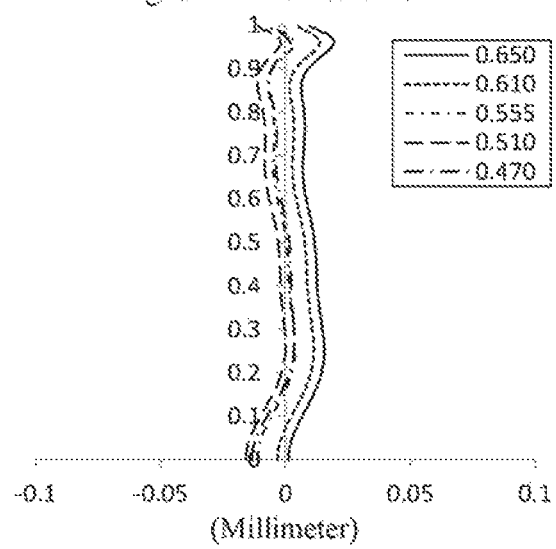
FIGS. 10A to 10D illustrate a longitudinal aberration curve, an astigmatic curve, a distortion curve, and a lateral color curve of the optical imaging lens assembly of the Example 5, respectively.
Figure 10B:
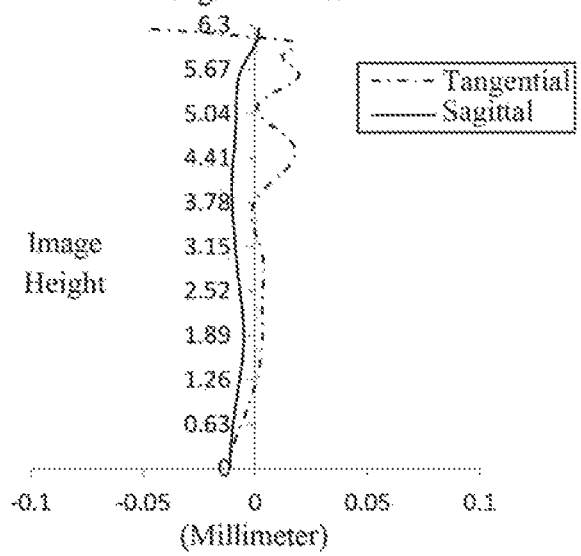
Figures 10C, 10D:
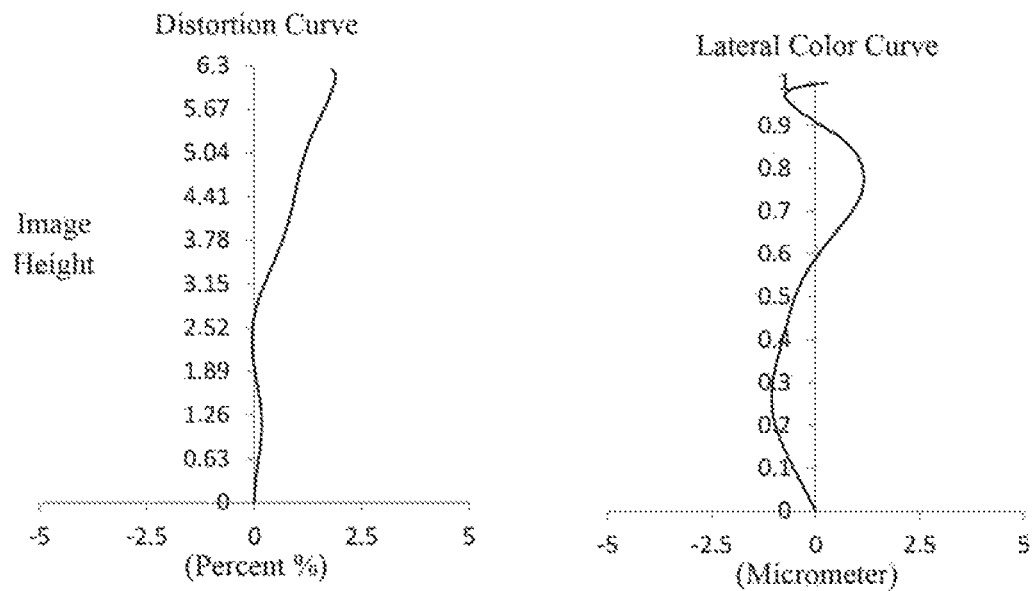

FIG. 10A illustrates a longitudinal aberration curve of the optical imaging lens assembly according to example 5, representing deviations of focal points converged by light of different wavelengths after passing through the lens assembly. FIG. 10B illustrates an astigmatic curve of the optical imaging lens assembly according to example 5, representing a curvature of a tangential plane and a curvature of a sagittal plane. FIG. 10C illustrates a distortion curve of the optical imaging lens assembly according to example 5, representing amounts of distortion corresponding to different image heights. FIG. 10D illustrates a lateral color curve of the optical imaging lens assembly according to example 5, representing deviations of different image heights on an imaging plane after light passes through the lens assembly. It can be seen from FIG. 10A to FIG. 10D that the optical imaging lens assembly provided in example 5 may achieve a good image quality.

Example 6

Figure 11:
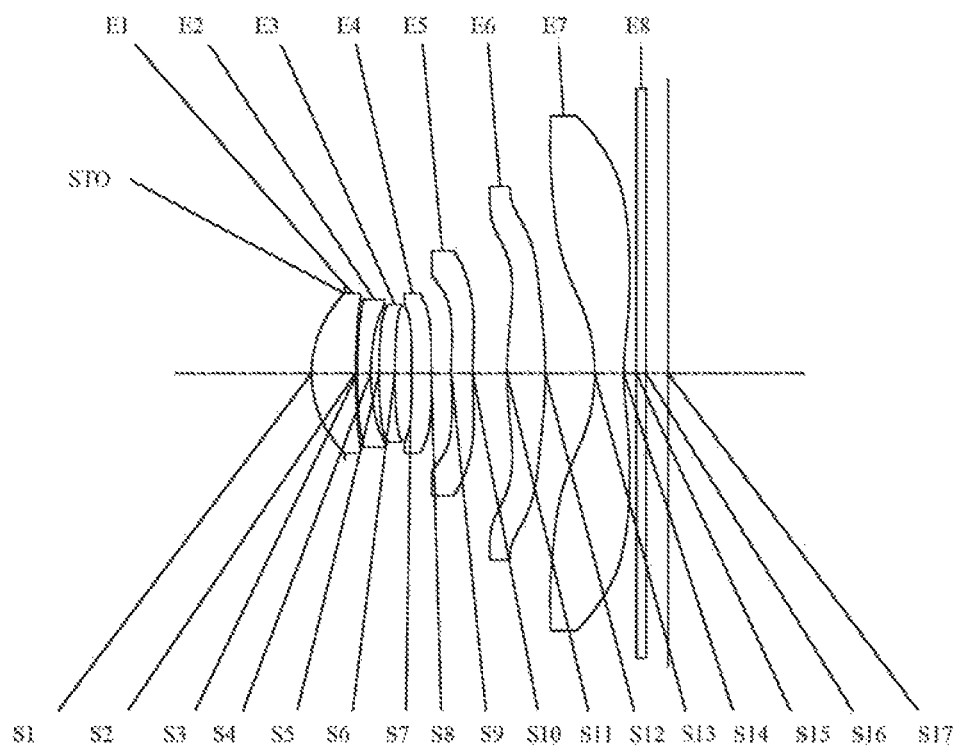
FIG. 11 illustrates a schematic structural view of an optical imaging lens assembly according to Example 6 of the present disclosure.

An optical imaging lens assembly according to example 6 of the present disclosure is described below with reference to FIG. 11 to FIG. 12D. FIG. 11 shows a schematic structural view of the optical imaging lens assembly according to example 6 of the present disclosure.

As shown in FIG. 11, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has negative refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens assembly satisfies f=6.85 mm, a distance TTL along the optical axis from the object-side surface S1 of the first lens E1 to the imaging plane S17 satisfies TTL=7.80 mm, half of a diagonal length ImgH of an effective pixel area on the imaging plane S17 satisfies ImgH=6.45 mm, and half of a maximal field-of-view Semi-FOV of the optical imaging lens assembly satisfies Semi-FOV=42.7°.

Table 11 is a table illustrating basic parameters of the optical imaging lens assembly of example 6, wherein the units for the radius of curvature, the thickness and the focal length are millimeter (mm).

TABLE 11

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7223 | | | | |
| S1 | Aspheric | 2.4572 | 0.9675 | 1.55 | 56.1 | 5.26 | 0.0330 |
| S2 | Aspheric | 14.7140 | 0.0350 | | | | −6.4427 |
| S3 | Aspheric | 14.1041 | 0.3000 | 1.67 | 20.4 | −13.01 | 6.6281 |
| S4 | Aspheric | 5.3273 | 0.1827 | | | | 1.5368 |
| S5 | Aspheric | 17.3644 | 0.3429 | 1.55 | 56.1 | −666.25 | −14.6424 |
| S6 | Aspheric | 16.4576 | 0.3641 | | | | 34.1015 |
| S7 | Aspheric | 61.0782 | 0.4300 | 1.67 | 20.4 | −499.99 | −99.0000 |
| S8 | Aspheric | 51.4796 | 0.4414 | | | | −99.0000 |
| S9 | Aspheric | 11.1496 | 0.4700 | 1.65 | 23.5 | −69.18 | 5.8539 |
| S10 | Aspheric | 8.7720 | 0.7363 | | | | −3.1326 |
| S11 | Aspheric | 7.1731 | 0.8408 | 1.55 | 56.1 | 7.47 | −12.2893 |
| S12 | Aspheric | −9.0683 | 1.0800 | | | | −13.9664 |
| S13 | Aspheric | −5.0125 | 0.6400 | 1.54 | 55.7 | −4.50 | −0.7279 |
| S14 | Aspheric | 4.8608 | 0.2753 | | | | −28.1872 |
| S15 | Spherical | Infinite | 0.2100 | 1.52 | 64.2 | | |
| S16 | Spherical | Infinite | 0.4839 | | | | |
| S17 | Spherical | Infinite | | | | | |

In example 6, the object-side surface and the image-side surface of any one of the first lens E1 to the seventh lens E7 are aspheric. Table 12 below shows high-order coefficients A4, A6, A8, A10, A12, A14, A16, A18 and A20 applicable to each aspheric surface S1 to S14 in example 6.

TABLE 12

| Surface number | A4 | A6 | A8 | A10 | A12 |
|---|---|---|---|---|---|
| S1 | −1.6200E−03 | 5.5100E−03 | −1.1930E−02 | 1.4868E−02 | −1.1440E−02 |
| S2 | 1.1097E−02 | −3.3540E−02 | 4.6911E−02 | 4.0630E−02 | 2.4420E−02 |
| S3 | 1.8016E−02 | −3.8770E−02 | 5.3677E−02 | 4.6330E−02 | 2.7694E−02 |
| S4 | 1.4736E−02 | −5.4000E−03 | −1.0340E−02 | 3.7320E−02 | 4.5790E−02 |
| S5 | 1.0788E−02 | −7.9400E−03 | 1.8576E−02 | −2.0080E−02 | 1.7952E−02 |
| S6 | 1.0530E−03 | 1.5370E−03 | 1.1376E−02 | −3.1260E−02 | 4.6996E−02 |
| S7 | −3.0260E−02 | 2.4261E−02 | −5.9930E−02 | 8.9559E−02 | −9.1390E−02 |
| S8 | −3.6610E−02 | 3.1555E−02 | −5.1830E−02 | 5.5254E−02 | 4.0120E−02 |
| S9 | −4.7800E−02 | 1.8806E−02 | −8.7900E−03 | 2.8510E−03 | −8.1000E−04 |
| S10 | −4.4430E−02 | 1.5048E−02 | −4.8700E−03 | 1.3350E−03 | −3.3000E−04 |
| S11 | −7.2400E−03 | −3.7000E−04 | 3.5800E−04 | −1.1000E−04 | 1.3200E−05 |
| S12 | 5.7180E−03 | −3.3500E−03 | 1.6260E−03 | 4.3000E−04 | 6.2300E−05 |
| S13 | −2.8600E−02 | 9.0670E−03 | −1.1800E−03 | 9.1000E−05 | 4.6000E−06 |
| S14 | −1.4550E−02 | 2.7300E−03 | −2.9000E−04 | 1.6700E−05 | 4.6000E−07 |

| Surface number | A14 | A16 | A18 | A20 |
|---|---|---|---|---|
| S1 | 5.4380E−03 | −1.5600E−03 | 2.4600E−04 | −1.6000E−05 |
| S2 | −1.0080E−02 | 2.6780E−03 | 4.0000E−04 | 2.5800E−05 |
| S3 | −1.1320E−02 | 2.9750E−03 | 4.4000E−04 | 2.8300E−05 |
| S4 | 3.0464E−02 | −1.1380E−02 | 2.2110E−03 | −1.7000E−04 |
| S5 | −1.1770E−02 | 5.4390E−03 | −1.4900E−03 | 1.7500E−04 |
| S6 | −3.9890E−02 | 1.9537E−02 | −5.1300E−03 | 5.6300E−04 |
| S7 | 6.0712E−02 | −2.5060E−02 | 5.8070E−03 | −5.8000E−04 |
| S8 | 1.8987E−02 | −5.5700E−03 | 9.1900E−04 | −6.4000E−05 |
| S9 | 1.8300E−04 | −3.2000E−05 | 4.2500E−06 | −2.7000E−07 |
| S10 | 6.8700E−05 | −9.4000E−06 | 7.1700E−07 | −2.3000E−08 |
| S11 | −3.0000E−07 | 4.7000E−08 | 3.4400E−09 | −7.0000E−11 |
| S12 | −5.5000E−06 | 2.8500E−07 | −8.2000E−09 | 9.8200E−11 |
| S13 | 1.5400E−07 | −3.3000E−09 | 4.2400E−11 | −2.4000E−13 |
| S14 | −1.5000E−09 | 4.5500E−10 | −1.1000E−11 | 9.0900E−14 |

Figure 12A:
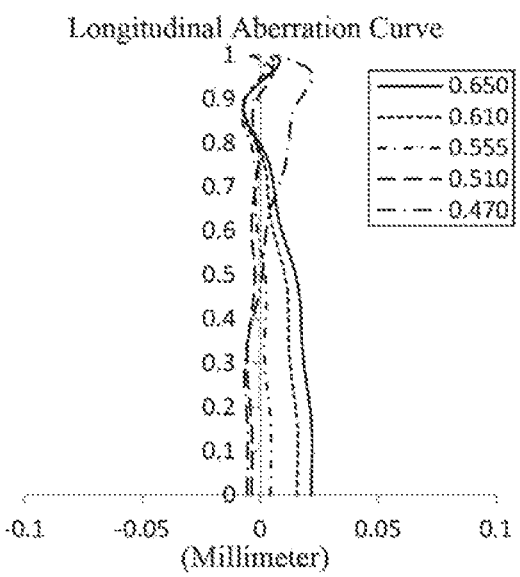
FIGS. 12A to 12D illustrate a longitudinal aberration curve, an astigmatic curve, a distortion curve, and a lateral color curve of the optical imaging lens assembly of the Example 6, respectively.
Figure 12B:
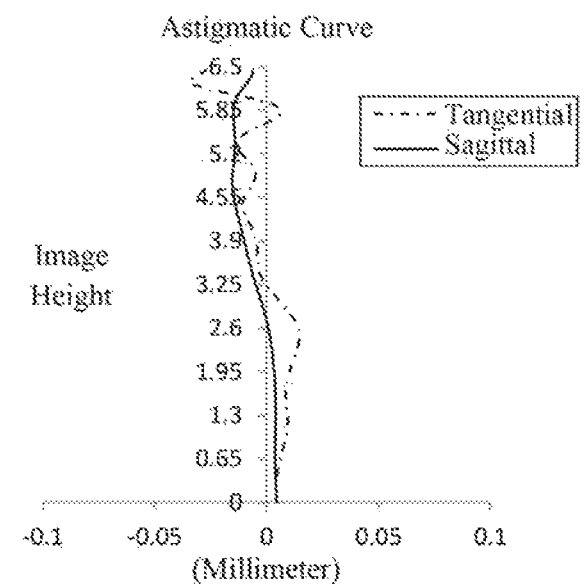
Figure 12C:
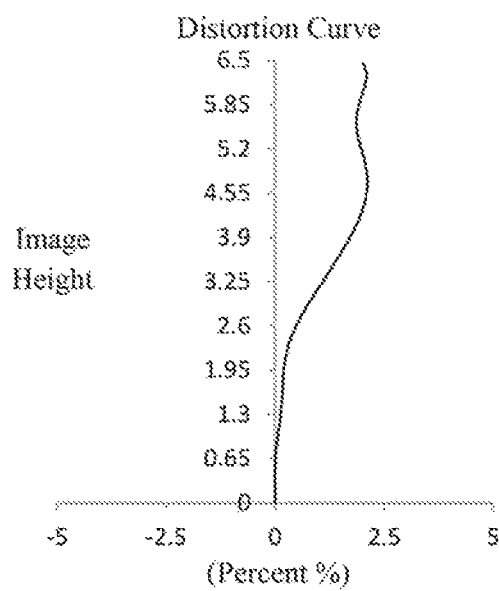
Figure 12D:
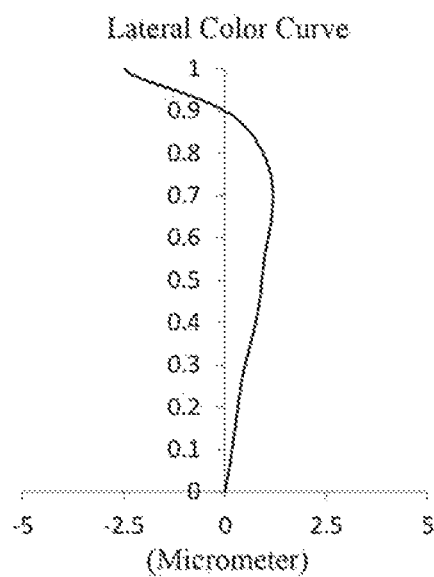

FIG. 12A illustrates a longitudinal aberration curve of the optical imaging lens assembly according to example 6, representing deviations of focal points converged by light of different wavelengths after passing through the lens assembly. FIG. 12B illustrates an astigmatic curve of the optical imaging lens assembly according to example 6, representing a curvature of a tangential plane and a curvature of a sagittal plane. FIG. 12C illustrates a distortion curve of the optical imaging lens assembly according to example 6, representing amounts of distortion corresponding to different image heights. FIG. 12D illustrates a lateral color curve of the optical imaging lens assembly according to example 6, representing deviations of different image heights on an imaging plane after light passes through the lens assembly. It can be seen from FIG. 12A to FIG. 12D that the optical imaging lens assembly provided in example 6 may achieve good image quality.

Example 7

Figure 13:
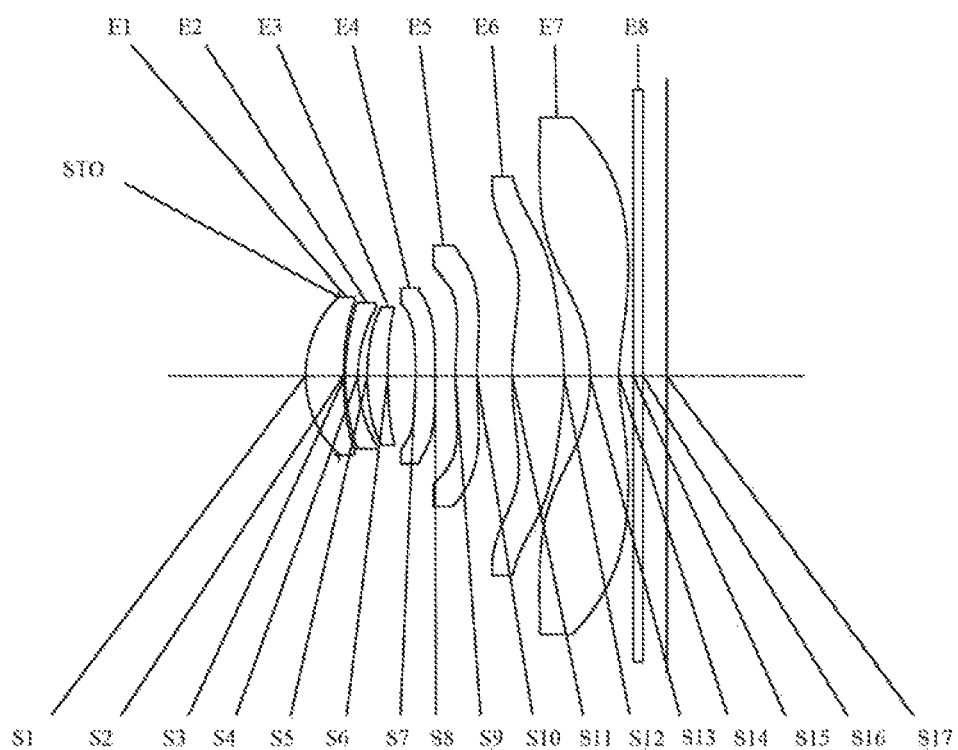
FIG. 13 illustrates a schematic structural view of an optical imaging lens assembly according to Example 7 of the present disclosure.

An optical imaging lens assembly according to example 7 of the present disclosure is described below with reference to FIG. 13 to FIG. 14D. FIG. 13 shows a schematic structural view of the optical imaging lens assembly according to example 7 of the present disclosure.

As shown in FIG. 13, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens assembly satisfies f=6.75 mm, a distance TTL along the optical axis from the object-side surface S1 of the first lens E1 to the imaging plane S17 satisfies TTL=7.90 mm, half of a diagonal length ImgH of an effective pixel area on the imaging plane S17 satisfies ImgH=6.48 mm, and half of a maximal field-of-view Semi-FOV of the optical imaging lens assembly satisfies Semi-FOV=43.2°.

Table 13 is a table illustrating basic parameters of the optical imaging lens assembly of example 7, wherein the units for the radius of curvature, the thickness and the focal length are millimeter (mm).

TABLE 13

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7269 | | | | |
| S1 | Aspheric | 2.4685 | 0.8313 | 1.55 | 56.1 | 6.90 | 0.0727 |
| S2 | Aspheric | 6.3066 | 0.0398 | | | | 2.4251 |
| S3 | Aspheric | 4.4081 | 0.2800 | 1.67 | 20.4 | −13.75 | −1.0000 |
| S4 | Aspheric | 2.9013 | 0.2032 | | | | 0.4475 |
| S5 | Aspheric | 4.8679 | 0.4495 | 1.55 | 56.1 | 15.57 | −0.6542 |
| S6 | Aspheric | 11.0205 | 0.6069 | | | | 34.8598 |
| S7 | Aspheric | −20.7428 | 0.4300 | 1.67 | 20.4 | −41.51 | −12.7016 |
| S8 | Aspheric | −83.3184 | 0.4459 | | | | −99.0000 |
| S9 | Aspheric | 7.2673 | 0.4700 | 1.65 | 23.5 | 624.99 | −0.9351 |
| S10 | Aspheric | 7.2132 | 0.7556 | | | | −11.3612 |
| S11 | Aspheric | 7.0473 | 1.1369 | 1.55 | 56.1 | 6.00 | −13.9582 |
| S12 | Aspheric | −5.7804 | 0.5690 | | | | −12.8848 |
| S13 | Aspheric | −4.6501 | 0.6400 | 1.54 | 55.7 | −3.85 | −1.0594 |
| S14 | Aspheric | 3.8977 | 0.3117 | | | | −15.8194 |
| S15 | Spherical | Infinite | 0.2100 | 1.52 | 64.2 | | |
| S16 | Spherical | Infinite | 0.5203 | | | | |
| S17 | Spherical | Infinite | | | | | |

In example 7, the object-side surface and the image-side surface of any one of the first lens E1 to the seventh lens E7 are aspheric. Table 14 below shows high-order coefficients A4, A6, A8, A10, A12, A14, A16, A18 and A20 applicable to each aspheric surface S1 to S14 in example 7.

TABLE 14

| Surface number | A4 | A6 | A8 | A10 | A12 |
|---|---|---|---|---|---|
| S1 | 4.3800E−04 | 2.4190E−03 | −4.8500E−03 | 6.2580E−03 | −4.9400E−03 |
| S2 | −5.0300E−03 | 1.4999E−02 | −1.6340E−02 | 9.3050E−03 | −1.8400E−03 |
| S3 | −1.9170E−02 | 1.9753E−02 | −2.0580E−02 | 1.4465E−02 | −6.2000E−03 |
| S4 | −1.7150E−02 | 1.5291E−02 | −2.1200E−02 | 2.1613E−02 | −1.3840E−02 |
| S5 | 8.0380E−03 | 2.4730E−03 | 8.9500E−04 | −2.6800E−03 | 3.3860E−03 |
| S6 | 1.4600E−05 | 1.3310E−03 | 2.8870E−03 | −1.0830E−02 | 1.6996E−02 |
| S7 | −2.8330E−02 | 1.4076E−02 | −3.8310E−02 | 5.6792E−02 | −5.6750E−02 |
| S8 | −3.3120E−02 | 1.7313E−02 | −2.3000E−02 | 2.1127E−02 | −1.3930E−02 |
| S9 | −4.2640E−02 | 1.3966E−02 | −5.0200E−03 | 1.4560E−03 | −5.5000E−04 |
| S10 | −3.6130E−02 | 9.3520E−03 | −1.3400E−03 | −2.3000E−04 | 1.4800E−04 |
| S11 | −1.0600E−03 | −2.5100E−03 | 8.3900E−04 | −2.0000E−04 | 2.6800E−05 |

TABLE 14-continued

| | | | | | |
|---|---|---|---|---|---|
| S12 | 1.2618E−02 | −5.6100E−03 | 1.5890E−03 | −3.1000E−04 | 3.6900E−05 |
| S13 | −1.8980E−02 | 4.3080E−03 | −3.1000E−04 | 3.8700E−06 | 8.9900E−07 |
| S14 | −1.5360E−02 | 3.0670E−03 | −4.3000E−04 | 4.0100E−05 | −2.5000E−06 |

| Surface number | A14 | A16 | A18 | A20 |
|---|---|---|---|---|
| S1 | 2.4250E−03 | −7.2000E−04 | 1.2100E−04 | −8.7000E−06 |
| S2 | −8.6000E−04 | 6.3600E−04 | −1.5000E−04 | 1.3100E−05 |
| S3 | 1.5850E−03 | −2.0000E−04 | 2.9100E−06 | 1.0700E−06 |
| S4 | 5.6190E−03 | −1.3800E−03 | 1.8300E−04 | −1.0000E−05 |
| S5 | −2.3000E−03 | 9.4400E−04 | −2.2000E−04 | 2.1800E−05 |
| S6 | −1.4390E−02 | 6.9570E−03 | −1.8000E−03 | 1.9600E−04 |
| S7 | 3.6327E−02 | −1.4360E−02 | 3.1830E−03 | −3.0000E−04 |
| S8 | 6.1120E−03 | −1.6800E−03 | 2.6100E−04 | −1.7000E−05 |
| S9 | 1.8400E−04 | −4.1000E−05 | 5.1500E−06 | −2.6000E−07 |
| S10 | −3.4000E−05 | 4.2700E−06 | −2.9000E−07 | 8.2500E−09 |
| S11 | −2.0000E−06 | 7.9200E−08 | −1.5000E−09 | 1.0100E−11 |
| S12 | −2.7000E−06 | 1.1900E−07 | −2.9000E−09 | 2.9500E−11 |
| S13 | −6.9000E−08 | 2.3300E−09 | −4.0000E−11 | 2.7500E−13 |
| S14 | 1.0500E−07 | −2.7000E−09 | 3.9100E−11 | −2.4000E−13 |

Figure 14A:
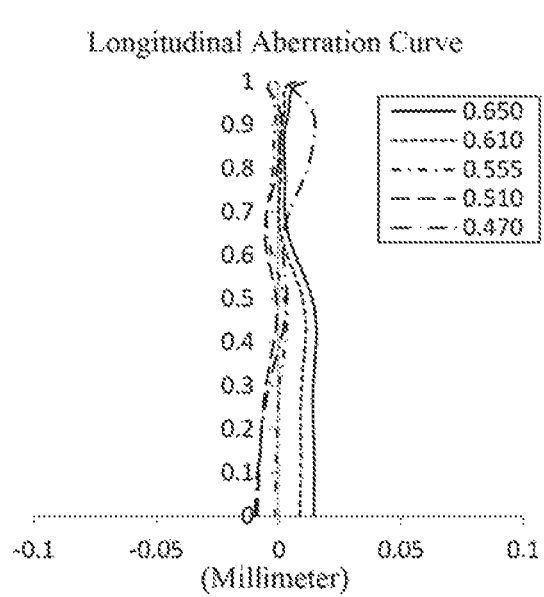
FIGS. 14A to 14D illustrate a longitudinal aberration curve, an astigmatic curve, a distortion curve, and a lateral color curve of the optical imaging lens assembly of the Example 7, respectively.
Figure 14B:
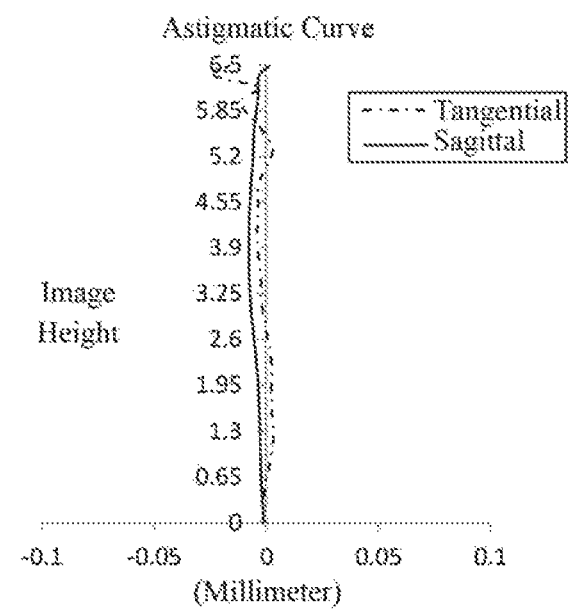
Figure 14C:
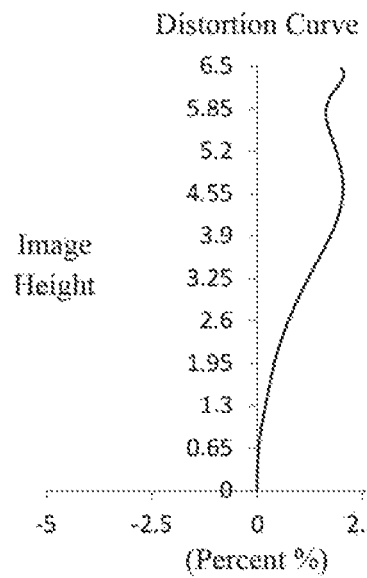
Figure 14D:
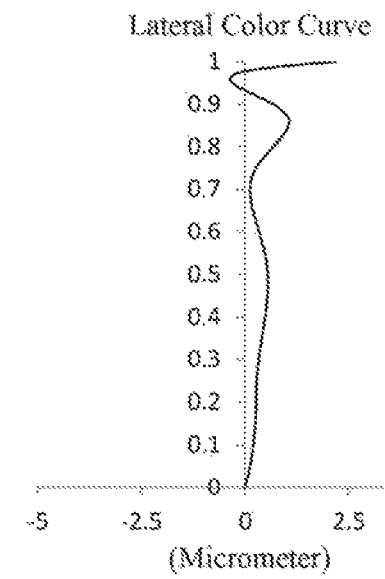

FIG. 14A illustrates a longitudinal aberration curve of the optical imaging lens assembly according to example 7, representing deviations of focal points converged by light of different wavelengths after passing through the lens assembly. FIG. 14B illustrates an astigmatic curve of the optical imaging lens assembly according to example 7, representing a curvature of a tangential plane and a curvature of a sagittal plane. FIG. 14C illustrates a distortion curve of the optical imaging lens assembly according to example 7, representing amounts of distortion corresponding to different image heights. FIG. 14D illustrates a lateral color curve of the optical imaging lens assembly according to example 7, representing deviations of different image heights on an imaging plane after light passes through the lens assembly. It can be seen from FIG. 14A to FIG. 14D that the optical imaging lens assembly provided in example 7 may achieve good image quality.

Example 8

Figure 15:
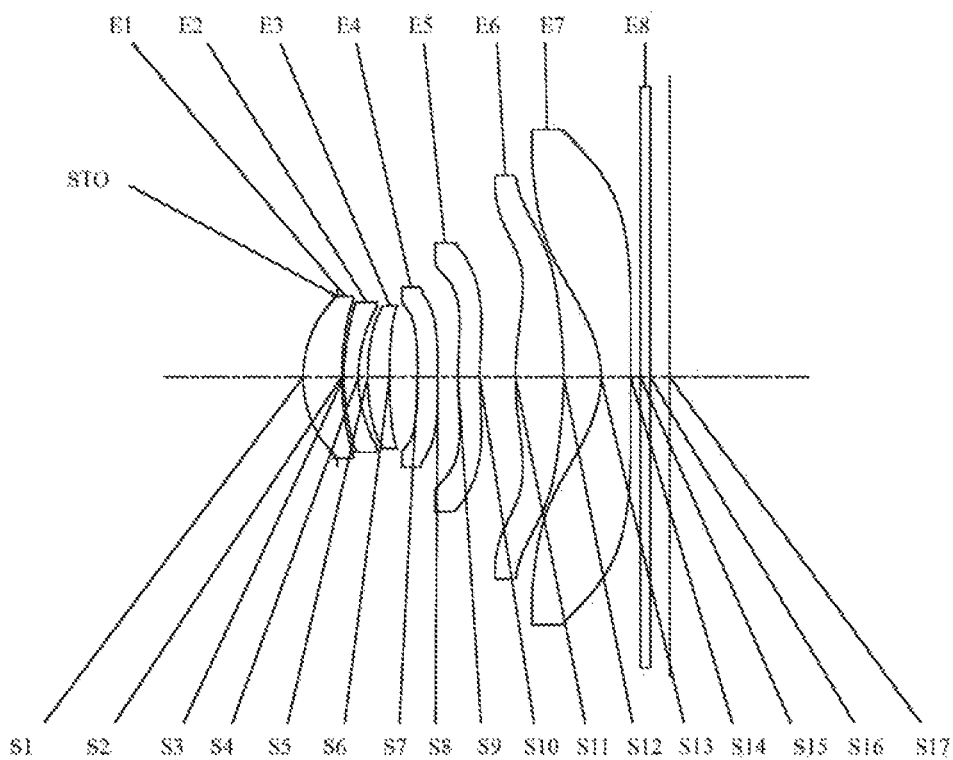
FIG. 15 illustrates a schematic structural view of an optical imaging lens assembly according to Example 8 of the present disclosure.

An optical imaging lens assembly according to example 8 of the present disclosure is described below with reference to FIG. 15 to FIG. 16D. FIG. 15 shows a schematic structural view of the optical imaging lens assembly according to example 8 of the present disclosure.

As shown in FIG. 15, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a convex surface. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens assembly satisfies f=6.83 mm, a distance TTL along the optical axis from the object-side surface S1 of the first lens E1 to the imaging plane S17 satisfies TTL=7.90 mm, half of a diagonal length ImgH of an effective pixel area on the imaging plane S17 satisfies ImgH=6.38 mm, and half of a maximal field-of-view Semi-FOV of the optical imaging lens assembly satisfies Semi-FOV=42.5°.

Table 15 is a table illustrating basic parameters of the optical imaging lens assembly of example 8, wherein the units for the radius of curvature, the thickness and the focal length are millimeter (mm).

TABLE 15

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | Spherical | Infinite | Infinite | | | | |
| STO | Spherical | Infinite | −0.7366 | | | | |
| S1 | Aspheric | 2.4964 | 0.8377 | 1.55 | 56.1 | 6.96 | 0.0410 |
| S2 | Aspheric | 6.4142 | 0.0454 | | | | 2.6205 |
| S3 | Aspheric | 4.4346 | 0.3100 | 1.67 | 20.4 | −13.67 | −1.0000 |

TABLE 15-continued

| Surface number | Surface type | Radius of curvature | Thickness/ Distance | Material Refractive index | Abbe number | Focal length | Conic coefficient |
|---|---|---|---|---|---|---|---|
| S4 | Aspheric | 2.9005 | 0.2035 | | | | 0.4308 |
| S5 | Aspheric | 4.9663 | 0.4701 | 1.55 | 56.1 | 15.09 | −0.5166 |
| S6 | Aspheric | 12.0805 | 0.6068 | | | | 35.7508 |
| S7 | Aspheric | −19.9008 | 0.4318 | 1.67 | 20.4 | −36.23 | 19.6926 |
| S8 | Aspheric | −113.6170 | 0.4387 | | | | −99.0000 |
| S9 | Aspheric | 6.8415 | 0.4700 | 1.65 | 23.5 | 624.99 | −1.6100 |
| S10 | Aspheric | 6.7723 | 0.7559 | | | | −19.1365 |
| S11 | Aspheric | 5.6498 | 1.0430 | 1.55 | 56.1 | 6.48 | −16.6333 |
| S12 | Aspheric | −8.8379 | 0.8073 | | | | −5.9690 |
| S13 | Aspheric | −2.1719 | 0.6400 | 1.54 | 55.7 | −4.15 | −2.5469 |
| S14 | Aspheric | −100.0000 | 0.2113 | | | | 80.2021 |
| S15 | Spherical | Infinite | 0.2100 | 1.52 | 64.2 | | |
| S16 | Spherical | Infinite | 0.4187 | | | | |
| S17 | Spherical | Infinite | | | | | |

In example 8, the object-side surface and the image-side surface of any one of the first lens E1 to the seventh lens E7 are aspheric. Table 16 below shows high-order coefficients A4, A6, A8, A10, A12, A14, A16, A18 and A20 applicable to each aspheric surface S1 to S14 in example 8.

TABLE 16

| Surface number | A4 | A6 | A8 | A10 | A12 |
|---|---|---|---|---|---|
| S1 | 7.2500E−04 | 2.0390E−03 | −3.9300E−03 | 5.1520E−03 | −4.1000E−03 |
| S2 | −7.2000E−03 | 1.8708E−02 | −1.9270E−02 | 1.0793E−02 | −2.3700E−03 |
| S3 | −2.1030E−02 | 2.3125E−02 | −2.3970E−02 | 1.6555E−02 | −7.1700E−03 |
| S4 | −1.7280E−02 | 1.5818E−02 | −2.1090E−02 | 1.9719E−02 | −1.1650E−02 |
| S5 | 8.6830E−03 | 2.5110E−03 | 1.9250E−03 | −4.7900E−03 | 5.4400E−03 |
| S6 | 8.6700E−04 | 2.0190E−03 | 2.0700E−03 | −9.2500E−03 | 1.4822E−02 |
| S7 | −3.0870E−02 | 2.2282E−02 | −5.5960E−02 | 8.0379E−02 | −7.7010E−02 |
| S8 | −3.8000E−02 | 2.5913E−02 | −3.4540E−02 | 3.1348E−02 | −1.9910E−02 |
| S9 | −5.1430E−02 | 2.2482E−02 | −9.5200E−03 | 2.8080E−03 | −6.7000E−04 |
| S10 | −4.4230E−02 | 1.7417E−02 | −5.6300E−03 | 1.2850E−03 | −2.0000E−04 |
| S11 | −4.5700E−03 | −7.0000E−04 | 3.5200E−04 | −1.3000E−04 | 2.1200E−05 |
| S12 | 4.6180E−03 | −1.3000E−03 | 4.2700E−04 | −1.2000E−04 | 1.7900E−05 |
| S13 | 2.8180E−03 | −2.5800E−03 | 8.3200E−04 | −1.2000E−04 | 9.1200E−06 |
| S14 | 5.2260E−03 | −2.0400E−03 | 3.2800E−04 | −3.2000E−05 | 1.9900E−06 |

| Surface number | A14 | A16 | A18 | A20 |
|---|---|---|---|---|
| S1 | 2.0140E−03 | −6.0000E−04 | 9.9500E−05 | −7.1000E−06 |
| S2 | −7.0000E−04 | 5.9000E−04 | −1.4000E−04 | 1.2200E−05 |
| S3 | 1.9130E−03 | −2.8000E−04 | 1.5100E−05 | 2.3100E−07 |
| S4 | 4.3840E−03 | −1.0000E−03 | 1.2400E−04 | −6.3000E−06 |
| S5 | −3.4600E−03 | 1.3200E−03 | −2.8000E−04 | 2.5700E−05 |
| S6 | −1.2460E−02 | 5.9230E−03 | −1.5000E−03 | 1.5900E−04 |
| S7 | 4.7435E−02 | −1.8100E−02 | 3.8780E−03 | −3.6000E−04 |
| S8 | 8.3770E−03 | −2.2100E−03 | 3.3100E−04 | −2.1000E−05 |
| S9 | 1.2900E−04 | −2.1000E−05 | 2.3100E−06 | −1.2000E−07 |
| S10 | 1.9800E−05 | −8.6000E−07 | −1.1000E−08 | 1.5700E−09 |
| S11 | −1.7000E−06 | 7.6300E−08 | −1.7000E−09 | 1.3600E−11 |
| S12 | −1.5000E−06 | 6.9600E−08 | −1.7000E−09 | 1.8200E−11 |
| S13 | −4.4000E−07 | 1.2600E−08 | −2.0000E−10 | 1.4000E−12 |
| S14 | −7.9000E−08 | 1.9700E−09 | −2.8000E−11 | 1.6600E−13 |

Figure 16A:
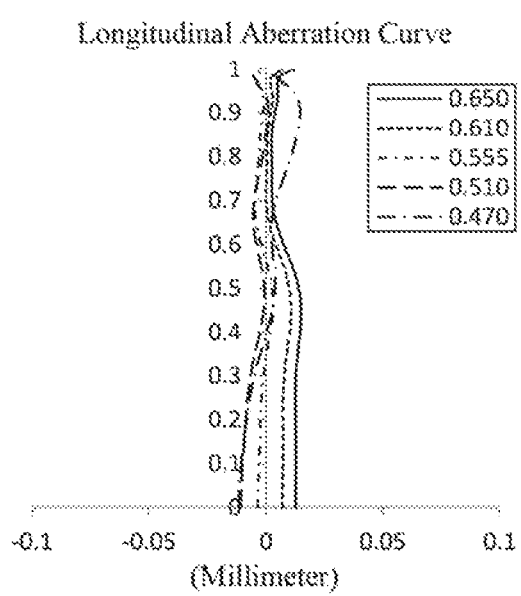
FIGS. 16A to 16D illustrate a longitudinal aberration curve, an astigmatic curve, a distortion curve, and a lateral color curve of the optical imaging lens assembly of the Example 8, respectively.
Figure 16B:
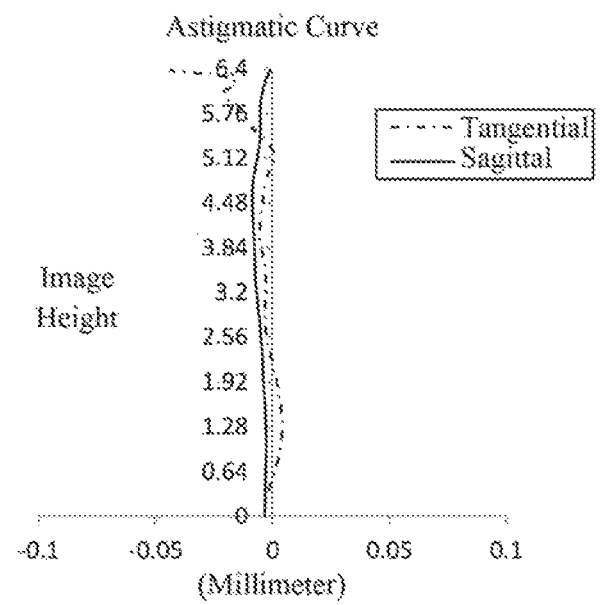
Figure 16C:
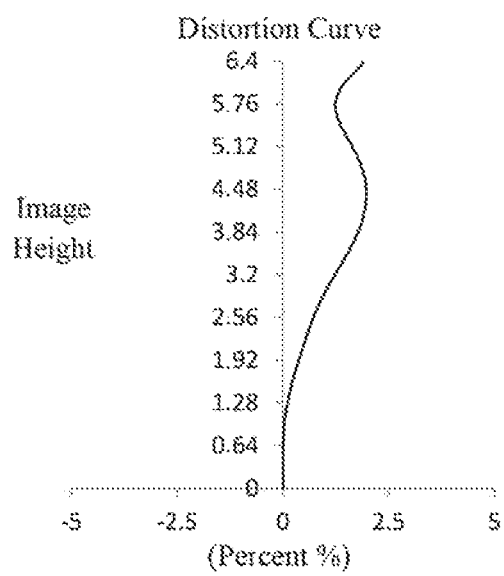
Figure 16D:
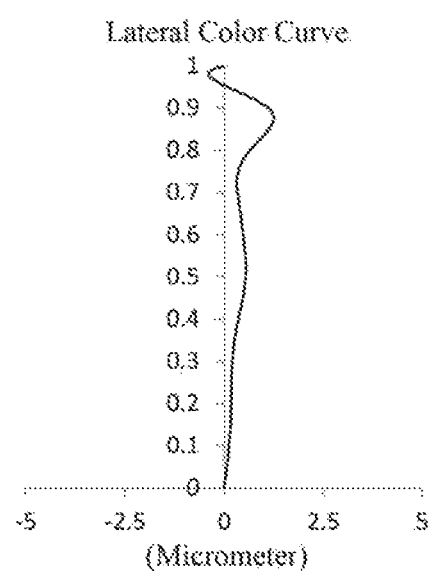

FIG. 16A illustrates a longitudinal aberration curve of the optical imaging lens assembly according to example 8, representing deviations of focal points converged by light of different wavelengths after passing through the lens assembly. FIG. 16B illustrates an astigmatic curve of the optical imaging lens assembly according to example 8, representing a curvature of a tangential plane and a curvature of a sagittal plane. FIG. 16C illustrates a distortion curve of the optical imaging lens assembly according to example 8, representing amounts of distortion corresponding to different image heights. FIG. 16D illustrates a lateral color curve of the optical imaging lens assembly according to example 8, representing deviations of different image heights on an imaging plane after light passes through the lens assembly.

It can be seen from FIG. 16A to FIG. 16D that the optical imaging lens assembly provided in example 8 may achieve good image quality.

Example 9

Figure 17:
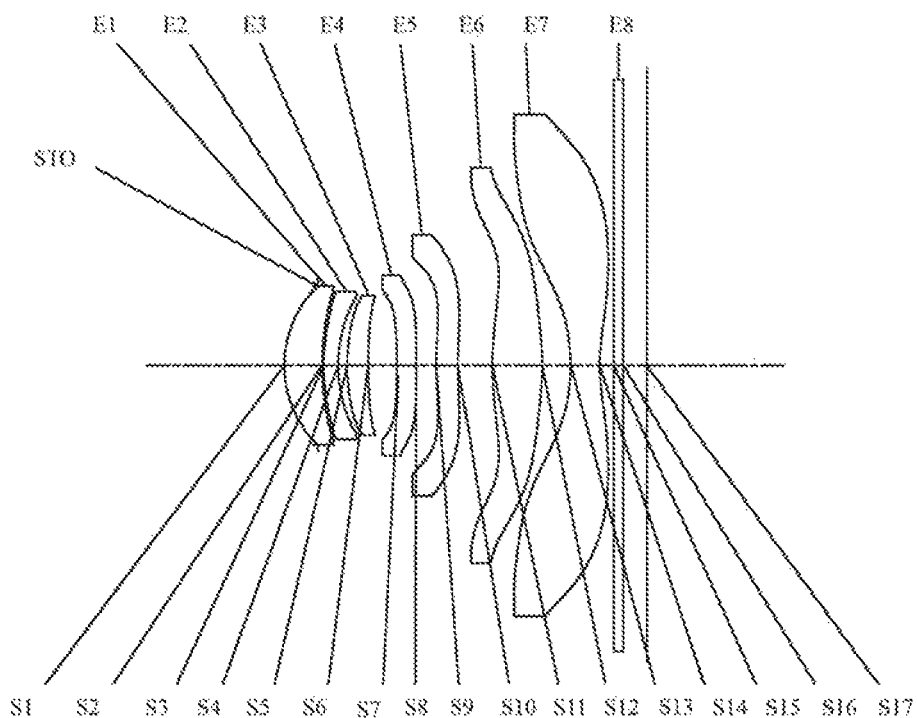
FIG. 17 illustrates a schematic structural view of an optical imaging lens assembly according to Example 9 of the present disclosure.

An optical imaging lens assembly according to example 9 of the present disclosure is described below with reference to FIG. 17 to FIG. 18D. FIG. 17 shows a schematic structural view of the optical imaging lens assembly according to example 9 of the present disclosure.

As shown in FIG. 17, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a concave surface, and an image-side surface S8 thereof is a concave surface. The fifth lens E5 has positive refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens assembly satisfies f=6.78 mm, a distance TTL along the optical axis from the object-side surface S1 of the first lens E1 to the imaging plane S17 satisfies TTL=7.90 mm, half of a diagonal length ImgH of an effective pixel area on the imaging plane S17 satisfies ImgH=6.42 mm, and half of a maximal field-of-view Semi-FOV of the optical imaging lens assembly satisfies Semi-FOV=42.9°.

Table 17 is a table illustrating basic parameters of the optical imaging lens assembly of example 9, wherein the units for the radius of curvature, the thickness and the focal length are millimeter (mm).

TABLE 17

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7277 | | | | |
| S1 | Aspheric | 2.4836 | 0.8282 | 1.55 | 56.1 | 6.96 | 0.0522 |
| S2 | Aspheric | 6.3207 | 0.0350 | | | | 3.1462 |
| S3 | Aspheric | 4.5107 | 0.3100 | 1.67 | 20.4 | −13.59 | 3.9169 |
| S4 | Aspheric | 2.9293 | 0.2006 | | | | 0.4932 |
| S5 | Aspheric | 4.8623 | 0.4559 | 1.55 | 56.1 | 15.09 | −0.5649 |
| S6 | Aspheric | 11.4680 | 0.6228 | | | | 35.2385 |
| S7 | Aspheric | −37.0114 | 0.4300 | 1.67 | 20.4 | −37.40 | −99.0000 |
| S8 | Aspheric | 76.9231 | 0.4342 | | | | −99.0000 |
| S9 | Aspheric | 7.1350 | 0.4700 | 1.65 | 23.5 | 624.99 | −2.4536 |
| S10 | Aspheric | 7.0761 | 0.7415 | | | | −16.2593 |
| S11 | Aspheric | 6.9782 | 1.0882 | 1.55 | 56.1 | 6.22 | −16.9189 |
| S12 | Aspheric | −6.2515 | 0.6171 | | | | −14.3182 |
| S13 | Aspheric | −4.8896 | 0.6400 | 1.54 | 55.7 | −3.99 | −0.8910 |
| S14 | Aspheric | 3.9855 | 0.3040 | | | | −15.1259 |
| S15 | Spherical | Infinite | 0.2100 | 1.52 | 64.2 | | |
| S16 | Spherical | Infinite | 0.5125 | | | | |
| S17 | Spherical | Infinite | | | | | |

In example 9, the object-side surface and the image-side surface of any one of the first lens E1 to the seventh lens E7 are aspheric. Table 18 below shows high-order coefficients A4, A6, A8, A10, A12, A14, A16, A18 and A20 applicable to each aspheric surface S1 to S14 in example 9.

TABLE 18

| Surface number | A4 | A6 | A8 | A10 | A12 |
|---|---|---|---|---|---|
| S1 | 6.4900E−04 | 2.2220E−03 | −4.6100E−03 | 6.1720E−03 | −4.9900E−03 |
| S2 | −5.9300E−03 | 1.7211E−02 | −1.9610E−02 | 1.2657E−02 | −4.2600E−03 |
| S3 | −2.5010E−02 | 1.9994E−02 | −2.3200E−02 | 1.7497E−02 | −8.7600E−03 |
| S4 | −1.5920E−02 | 1.4373E−02 | −1.9650E−02 | 1.9139E−02 | −1.1720E−02 |
| S5 | 8.2530E−03 | 9.6800E−04 | 4.9970E−03 | −8.8500E−03 | 9.2600E−03 |
| S6 | −2.3000E−04 | 2.9790E−03 | −6.7000E−04 | −5.6000E−03 | 1.2064E−02 |
| S7 | −2.9860E−02 | 1.9746E−02 | −4.7490E−02 | 6.6908E−02 | −6.3530E−02 |
| S8 | −3.6230E−02 | 2.3247E−02 | −2.8910E−02 | 2.5007E−02 | −1.5430E−02 |
| S9 | −4.8790E−02 | 1.8791E−02 | −8.1400E−03 | 3.1560E−03 | −1.2400E−03 |
| S10 | −4.0490E−02 | 1.2189E−02 | −2.9600E−03 | 4.8100E−04 | −5.7000E−05 |

TABLE 18-continued

| | | | | | |
|---|---|---|---|---|---|
| S11 | −2.4000E−04 | −3.0200E−03 | 9.7200E−04 | −2.3000E−04 | 3.3100E−05 |
| S12 | 1.3107E−02 | −5.6000E−03 | 1.5160E−03 | −2.9000E−04 | 3.6100E−05 |
| S13 | −1.9570E−02 | 4.2550E−03 | −3.0000E−04 | 1.7900E−06 | 1.0800E−06 |
| S14 | −1.6920E−02 | 3.5120E−03 | −5.2000E−04 | 5.3800E−05 | −3.8000E−06 |

| Surface number | A14 | A16 | A18 | A20 |
|---|---|---|---|---|
| S1 | 2.4860E−03 | −7.5000E−04 | 1.2600E−04 | −9.1000E−06 |
| S2 | 2.5200E−04 | 3.3700E−04 | −1.1000E−04 | 1.0600E−05 |
| S3 | 2.8870E−03 | −5.8000E−04 | 6.2100E−05 | −2.7000E−06 |
| S4 | 4.5610E−03 | −1.0700E−03 | 1.3600E−04 | −7.1000E−06 |
| S5 | −5.8700E−03 | 2.2760E−03 | −4.9000E−04 | 4.6000E−05 |
| S6 | −1.1270E−02 | 5.6640E−03 | −1.4900E−03 | 1.6200E−04 |
| S7 | 3.8834E−02 | −1.4700E−02 | 3.1250E−03 | −2.9000E−04 |
| S8 | 6.3490E−03 | −1.6400E−03 | 2.4100E−04 | −1.5000E−05 |
| S9 | 3.7600E−04 | −7.6000E−05 | 8.8200E−06 | −4.3000E−07 |
| S10 | 3.2800E−06 | 2.6700E−07 | −5.4000E−08 | 2.3100E−09 |
| S11 | −2.7000E−06 | 1.2400E−07 | −3.0000E−09 | 3.0800E−11 |
| S12 | −2.7000E−06 | 1.2500E−07 | −3.1000E−09 | 3.3000E−11 |
| S13 | −8.1000E−08 | 2.7900E−09 | −4.9000E−11 | 3.5800E−13 |
| S14 | 1.7300E−07 | −5.0000E−09 | 8.0500E−11 | −5.6000E−13 |

Figures 18A, 18B:
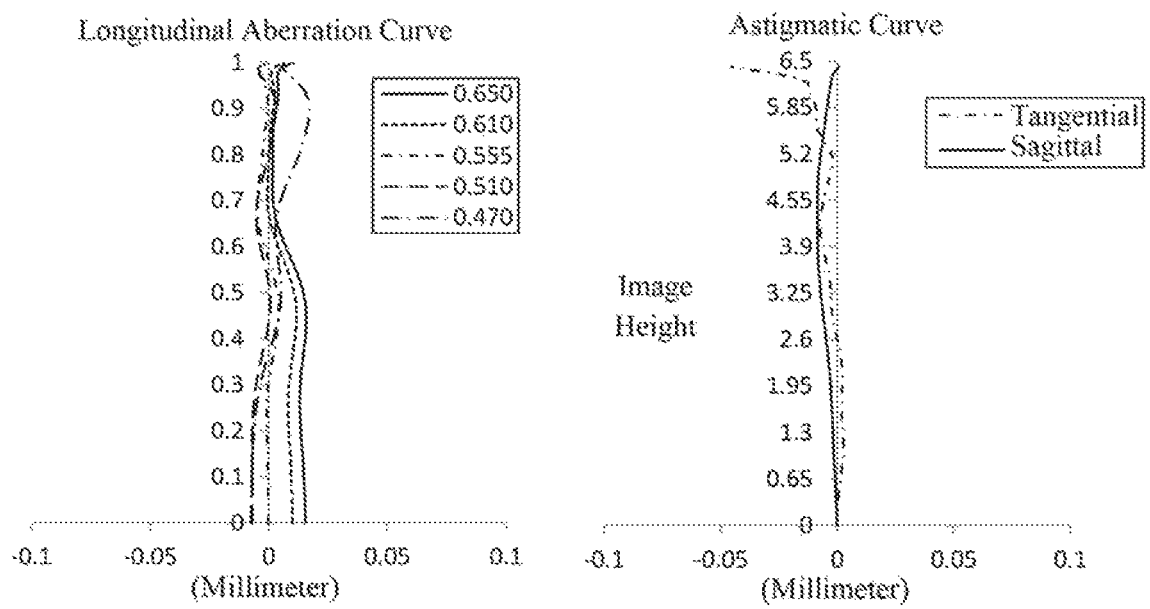
FIGS. 18A to 18D illustrate a longitudinal aberration curve, an astigmatic curve, a distortion curve, and a lateral color curve of the optical imaging lens assembly of the Example 9, respectively.
Figure 18C:
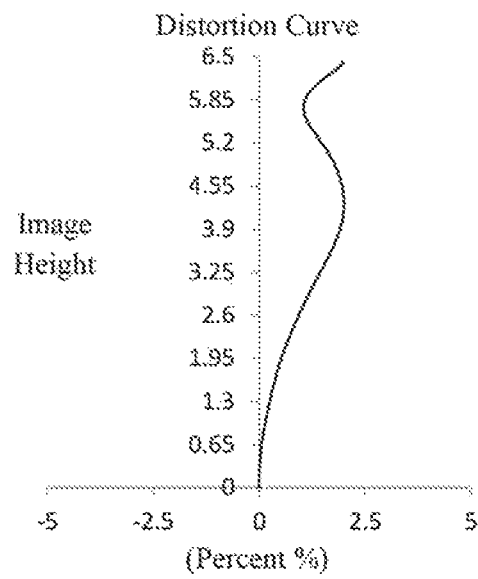
Figure 18D:
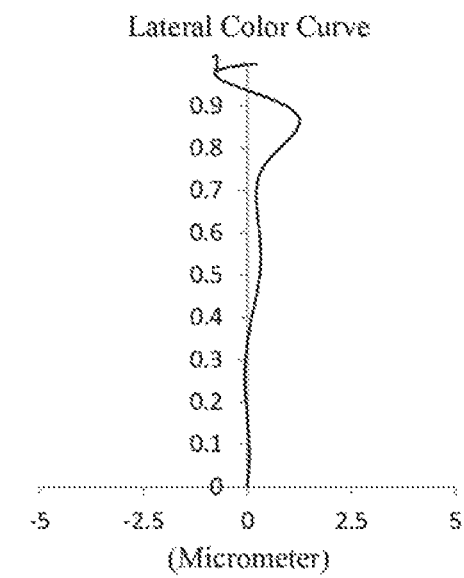

FIG. 18A illustrates a longitudinal aberration curve of the optical imaging lens assembly according to example 9, representing deviations of focal points converged by light of different wavelengths after passing through the lens assembly. FIG. 18B illustrates an astigmatic curve of the optical imaging lens assembly according to example 9, representing a curvature of a tangential plane and a curvature of a sagittal plane. FIG. 18C illustrates a distortion curve of the optical imaging lens assembly according to example 9, representing amounts of distortion corresponding to different image heights. FIG. 18D illustrates a lateral color curve of the optical imaging lens assembly according to example 9, representing deviations of different image heights on an imaging plane after light passes through the lens assembly. It can be seen from FIG. 18A to FIG. 18D that the optical imaging lens assembly provided in example 9 may achieve good image quality.

Example 10

Figure 19:
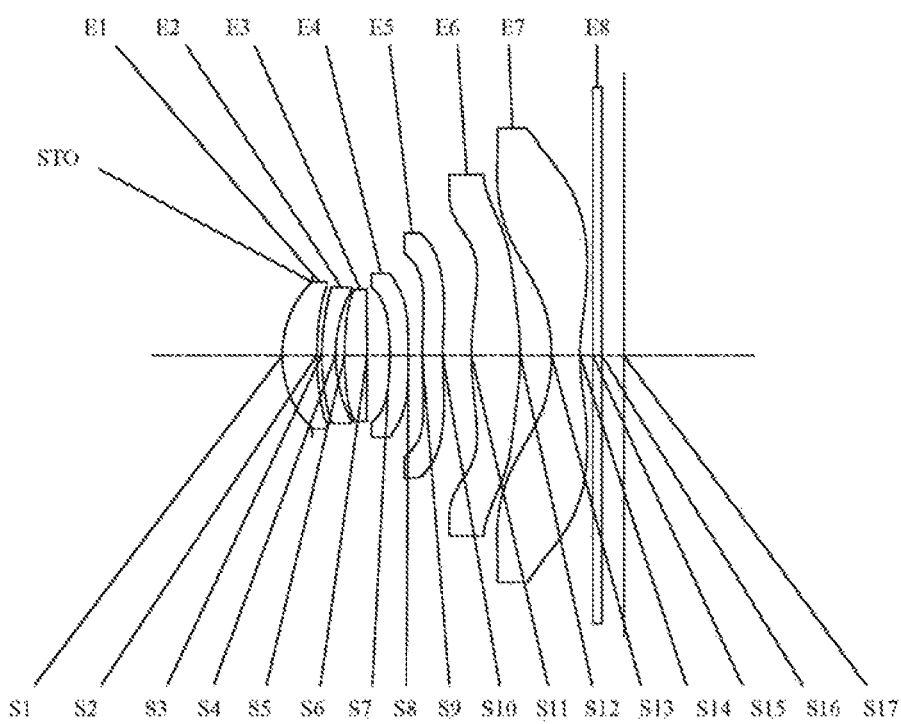
FIG. 19 illustrates a schematic structural view of an optical imaging lens assembly according to Example 10 of the present disclosure.

An optical imaging lens assembly according to example 10 of the present disclosure is described below with reference to FIG. 19 to FIG. 20D. FIG. 19 shows a schematic structural view of the optical imaging lens assembly according to example 10 of the present disclosure.

As shown in FIG. 19, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens assembly satisfies f=6.62 mm, a distance TTL along the optical axis from the object-side surface S1 of the first lens E1 to the imaging plane S17 satisfies TTL=7.85 mm, half of a diagonal length ImgH of an effective pixel area on the imaging plane S17 satisfies ImgH=6.30 mm, and half of a maximal field-of-view Semi-FOV of the optical imaging lens assembly satisfies Semi-FOV=43.0°.

Table 19 is a table illustrating basic parameters of the optical imaging lens assembly of example 10, wherein the units for the radius of curvature, the thickness and the focal length are millimeter (mm).

TABLE 19

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −0.6857 | | | | |
| S1 | Aspheric | 2.5114 | 0.7970 | 1.55 | 56.1 | 7.01 | 0.1801 |
| S2 | Aspheric | 6.4857 | 0.1108 | | | | 6.3688 |

TABLE 19-continued

| Surface number | Surface type | Radius of curvature | Thickness/ Distance | Material Refractive index | Abbe number | Focal length | Conic coefficient |
|---|---|---|---|---|---|---|---|
| S3 | Aspheric | 4.6464 | 0.3200 | 1.67 | 20.4 | −17.70 | 4.6567 |
| S4 | Aspheric | 3.2426 | 0.2097 | | | | 0.2374 |
| S5 | Aspheric | 9.0755 | 0.5170 | 1.55 | 56.1 | 14.34 | 0.1634 |
| S6 | Aspheric | −55.8659 | 0.5217 | | | | 99.0000 |
| S7 | Aspheric | −9.2071 | 0.4300 | 1.67 | 20.4 | −20.77 | 17.8025 |
| S8 | Aspheric | −27.9590 | 0.3177 | | | | 99.0000 |
| S9 | Aspheric | 7.7537 | 0.4700 | 1.65 | 23.5 | 625.00 | 0.5203 |
| S10 | Aspheric | 7.7180 | 0.6486 | | | | −4.4587 |
| S11 | Aspheric | 6.8871 | 1.1237 | 1.55 | 56.1 | 5.89 | −15.3761 |
| S12 | Aspheric | −5.6772 | 0.7227 | | | | −15.8236 |
| S13 | Aspheric | −4.1911 | 0.6489 | 1.54 | 55.7 | −3.77 | −1.0400 |
| S14 | Aspheric | 4.1213 | 0.2968 | | | | −21.0937 |
| S15 | Spherical | Infinite | 0.2100 | 1.52 | 64.2 | | |
| S16 | Spherical | Infinite | 0.5054 | | | | |
| S17 | Spherical | Infinite | | | | | |

In example 10, the object-side surface and the image-side surface of any one of the first lens E1 to the seventh lens E7 are aspheric. Table 20 below shows high-order coefficients A4, A6, A8, A10, A12, A14, A16, A18 and A20 applicable to each aspheric surface S1 to S14 in example 10.

TABLE 20

| Surface number | A4 | A6 | A8 | A10 | A12 |
|---|---|---|---|---|---|
| S1 | −3.0000E−04 | 2.3880E−03 | −5.7600E−03 | 8.3370E−03 | −7.2400E−03 |
| S2 | −7.2100E−03 | 2.3120E−03 | 4.9830E−03 | −1.0790E−02 | 1.1403E−02 |
| S3 | −2.7280E−02 | 1.8313E−02 | −3.8510E−02 | 5.1496E−02 | 4.0370E−02 |
| S4 | −1.0750E−02 | 1.0304E−02 | −1.8880E−02 | 2.6546E−02 | −2.1890E−02 |
| S5 | 1.0685E−02 | −4.1100E−03 | 1.8146E−02 | −2.9640E−02 | 3.0196E−02 |
| S6 | 8.2700E−04 | −6.8900E−03 | 2.1510E−02 | −3.7620E−02 | 4.1673E−02 |
| S7 | −3.0500E−02 | 1.6562E−02 | −5.1960E−02 | 8.1778E−02 | −8.4230E−02 |
| S8 | −4.0040E−02 | 2.7364E−02 | −3.7220E−02 | 3.4091E−02 | −2.1750E−02 |
| S9 | −5.3480E−02 | 3.0797E−02 | −1.7190E−02 | 7.5920E−03 | −2.5900E−03 |
| S10 | −4.9470E−02 | 2.0437E−02 | −7.5100E−03 | 2.3380E−03 | −5.8000E−04 |
| S11 | −4.1400E−03 | −3.8000E−04 | −1.1000E−04 | 6.6600E−05 | −2.8000E−05 |
| S12 | 1.0177E−02 | −3.2300E−03 | 9.5800E−04 | −2.2000E−04 | 2.7800E−05 |
| S13 | −1.7830E−02 | 3.1590E−03 | −2.6000E−05 | −3.2000E−05 | 3.7200E−06 |
| S14 | −1.0200E−02 | 7.4200E−04 | 7.2900E−05 | −2.6000E−05 | 3.0200E−06 |

| Surface number | A14 | A16 | A18 | A20 |
|---|---|---|---|---|
| S1 | 3.8650E−03 | −1.2400E−03 | 2.2300E−04 | −1.7000E−05 |
| S2 | −6.9200E−03 | 2.4620E−03 | −4.7000E−04 | 3.6400E−05 |
| S3 | 1.9058E−02 | −5.3000E−03 | 7.9900E−04 | −5.1000E−05 |
| S4 | 1.0945E−02 | −3.2000E−03 | 4.9500E−04 | −3.1000E−05 |
| S5 | −1.9160E−02 | 7.4320E−03 | −1.6100E−03 | 1.5000E−04 |
| S6 | −2.9140E−02 | 1.2450E−02 | −2.9600E−03 | 3.0300E−04 |
| S7 | 5.5114E−02 | −2.2140E−02 | 4.9560E−03 | 4.7000E−04 |
| S8 | 9.2110E−03 | −2.4500E−03 | 3.6800E−04 | −2.4000E−05 |
| S9 | 6.1300E−04 | −9.3000E−05 | 7.9300E−06 | −2.8000E−07 |
| S10 | 9.9400E−05 | −1.1000E−05 | 7.1400E−07 | −2.0000E−08 |
| S11 | 5.1200E−06 | −4.5000E−07 | 1.9400E−08 | −3.3000E−10 |
| S12 | −2.0000E−06 | 8.1500E−08 | −1.7000E−09 | 1.3400E−11 |
| S13 | −2.1000E−07 | 6.7700E−09 | −1.2000E−10 | 9.0300E−13 |
| S14 | −1.9000E−07 | 6.4400E−09 | −1.2000E−10 | 8.9700E−13 |

Figure 20A:
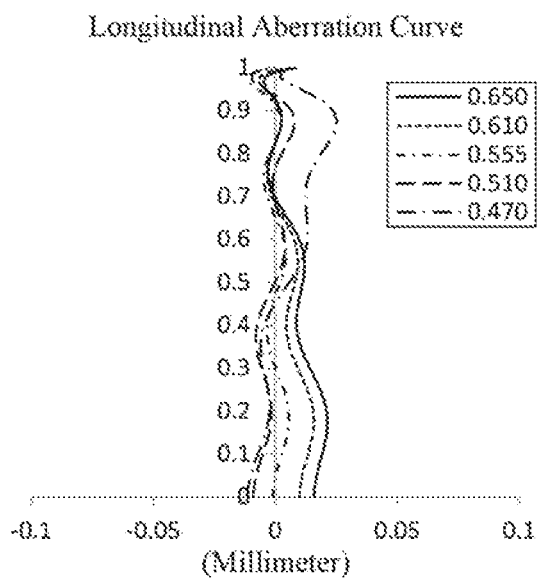
FIGS. 20A to 20D illustrate a longitudinal aberration curve, an astigmatic curve, a distortion curve, and a lateral color curve of the optical imaging lens assembly of the Example 10, respectively.
Figure 20B:
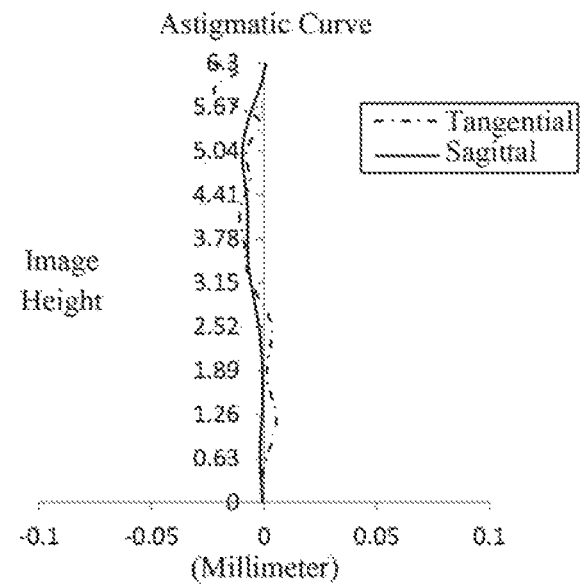
Figure 20C:
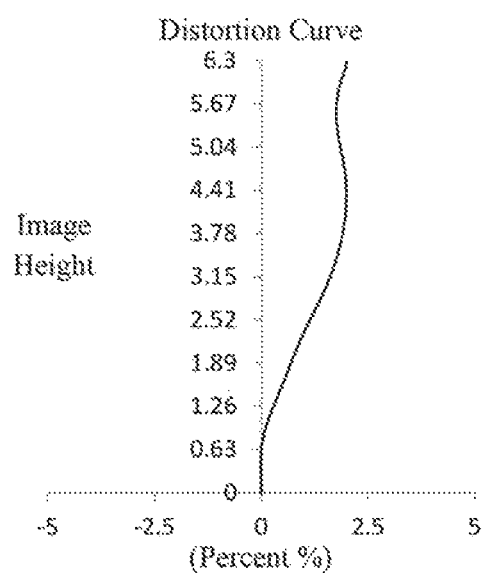
Figure 20D:
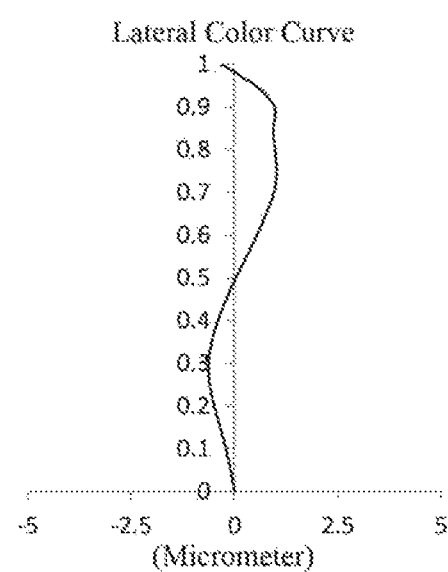

FIG. 20A illustrates a longitudinal aberration curve of the optical imaging lens assembly according to example 10, representing deviations of focal points converged by light of different wavelengths after passing through the lens assembly. FIG. 20B illustrates an astigmatic curve of the optical imaging lens assembly according to example 10, representing a curvature of a tangential plane and a curvature of a sagittal plane. FIG. 20C illustrates a distortion curve of the optical imaging lens assembly according to example 10, representing amounts of distortion corresponding to different image heights. FIG. 20D illustrates a lateral color curve of the optical imaging lens assembly according to example 10, representing deviations of different image heights on an imaging plane after light passes through the lens assembly. It can be seen from FIG. 20A to FIG. 20D that the optical imaging lens assembly provided in example 10 may achieve good image quality.

In view of the above, examples 1 to 10 respectively satisfy the relationship shown in Table 21.

TABLE 21

| Condition | Example 1 | 2 | 3 | 4 | 5 | 6 | 7 | 8 | 9 | 10 |
|---|---|---|---|---|---|---|---|---|---|---|
| ImgH/(TTL/ImgH) (mm) | 5.61 | 5.47 | 5.38 | 5.44 | 5.13 | 5.33 | 5.32 | 5.15 | 5.22 | 5.06 |
| f*tan(Semi-FOV) (mm) | 6.38 | 6.30 | 6.25 | 6.28 | 6.12 | 6.33 | 6.35 | 6.26 | 6.29 | 6.17 |
| f1/(R1 + R2) | 1.04 | 0.90 | 0.39 | 0.48 | 0.39 | 0.31 | 0.79 | 0.78 | 0.79 | 0.78 |
| (f6 + f7)/f | 0.48 | 0.43 | 0.42 | 0.53 | 0.35 | 0.43 | 0.32 | 0.34 | 0.33 | 0.32 |
| R11/R10 | 0.93 | 0.82 | 0.61 | 0.37 | 0.70 | 0.82 | 0.98 | 0.83 | 0.99 | 0.89 |
| (T56 + CT6 + T67 + CT7)/TTL*5 | 1.84 | 1.86 | 1.86 | 1.84 | 2.04 | 2.11 | 1.96 | 2.05 | 1.95 | 2.00 |
| f/(R3 + R4) | 0.85 | 0.89 | 0.50 | 0.35 | 0.73 | 0.35 | 0.92 | 0.93 | 0.91 | 0.84 |
| f123/f | 1.04 | 1.03 | 1.19 | 1.21 | 1.14 | 1.13 | 1.06 | 1.04 | 1.05 | 0.98 |
| SAG72/SAG62 | 1.27 | 1.20 | 1.41 | 1.42 | 1.29 | 1.33 | 0.90 | 1.43 | 1.06 | 1.45 |
| |SAG51 + SAG52|/CT5 | 1.94 | 2.00 | 2.49 | 2.51 | 1.66 | 1.84 | 2.16 | 2.19 | 2.34 | 2.00 |
| (DT41 + DT51 + DT61 + DT71)/(DT11 + DT21 + DT31) | 2.46 | 2.67 | 2.64 | 2.58 | 2.59 | 2.61 | 2.73 | 2.65 | 2.68 | 2.60 |

The foregoing is only a description of the preferred examples of the present disclosure and the applied technical principles. It should be appreciated by those skilled in the art that the scope of the invention of the present disclosure is not limited to the technical solutions formed by the particular combinations of the above technical features. The scope of the invention should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, sequentially from an object side to an image side of the optical imaging lens assembly along an optical axis, comprising:
   a first lens having positive refractive power;
   a second lens having negative refractive power;
   a third lens having refractive power;
   a fourth lens having refractive power;
   a fifth lens having refractive power with a convex object-side surface;
   a sixth lens having positive refractive power with a convex object-side surface and a convex image-side surface; and
   a seventh lens having negative refractive power,
   wherein ImgH/(TTL/ImgH)>5.0 mm,
   where TTL is a distance along the optical axis from an object-side surface of the first lens to an imaging plane of the optical imaging lens assembly, and ImgH is half of a diagonal length of an effective pixel area on the imaging plane of the optical imaging lens assembly; and
   wherein 2.3<(DT41+DT51+DT61+DT71)/(DT11+DT21+DT31)<2.8,
   where DT11 is a maximum effective radius of the object-side surface of the first lens, DT21 is a maximum effective radius of an object-side surface of the second lens, DT31 is a maximum effective radius of an object-side surface of the third lens, DT41 is a maximum effective radius of an object-side surface of the fourth lens, DT51 is a maximum effective radius of the object-side surface of the fifth lens, DT61 is a maximum effective radius of the object-side surface of the sixth lens, and DT71 is a maximum effective radius of an object-side surface of the seventh lens.

2. The optical imaging lens assembly according to claim 1, wherein 0.3<f1/(R1+R2)<1.1,
   where f1 is an effective focal length of the first lens, R1 is a radius of curvature of the object-side surface of the first lens, and R2 is a radius of curvature of an image-side surface of the first lens.

3. The optical imaging lens assembly according to claim 1, wherein 0.2<(f6+f7)/f<0.7,
   where f is a total effective focal length of the optical imaging lens assembly, f6 is an effective focal length of the sixth lens, and f7 is an effective focal length of the seventh lens.

4. The optical imaging lens assembly according to claim 1, wherein 0.3<R11/R10<1.0,
   where R11 is a radius of curvature of the object-side surface of the sixth lens, and R10 is a radius of curvature of an image-side surface of the fifth lens.

5. The optical imaging lens assembly according to claim 1, wherein 1.7<(T56+CT6+T67+CT7)/TTL*5<2.2,
   where T56 is a spaced interval between the fifth lens and the sixth lens along the optical axis, CT6 is a center thickness of the sixth lens along the optical axis, T67 is a spaced interval between the sixth lens and the seventh lens along the optical axis, CT7 is a center thickness of the seventh lens along the optical axis, and TTL is the distance along the optical axis from the object-side surface of the first lens to the imaging plane of the optical imaging lens assembly.

6. The optical imaging lens assembly according to claim 1, wherein 40°<Semi-FOV<45°,
   where Semi-FOV is half of a maximal field-of-view of the optical imaging lens assembly.

7. The optical imaging lens assembly according to claim 1, wherein 0.3<f/(R3+R4)<1.0,
   where f is a total effective focal length of the optical imaging lens assembly, R3 is a radius of curvature of an object-side surface of the second lens, and R4 is a radius of curvature of an image-side surface of the second lens.

8. The optical imaging lens assembly according to claim 1, wherein 0.8<f123/f<1.3,
   where f123 is a combined focal length of the first lens, the second lens and the third lens, and f is a total effective focal length of the optical imaging lens assembly.

9. The optical imaging lens assembly according to claim 1, wherein 0.8<SAG72/SAG62<1.5,
   where SAG72 is an on-axis distance from an intersection of an image-side surface of the seventh lens and the optical axis to a vertex of an effective radius of the image-side surface of the seventh lens, and SAG62 is an on-axis distance from an intersection of the image-side surface of the sixth lens and the optical axis to a vertex of an effective radius of the image-side surface of the sixth lens.

10. The optical imaging lens assembly according to claim 1, wherein $1.6<|SAG51+SAG52|/CT5<2.6$,
where SAG51 is an on-axis distance from an intersection of the object-side surface of the fifth lens and the optical axis to a vertex of an effective radius of the object-side surface of the fifth lens, SAG52 is an on-axis distance from an intersection of an image-side surface of the fifth lens and the optical axis to a vertex of an effective radius of the image-side surface of the fifth lens, and CT5 is a center thickness of the fifth lens along the optical axis.

11. An optical imaging lens assembly, sequentially from an object side to an image side of the optical imaging lens assembly along an optical axis, comprising:
a first lens having positive refractive power;
a second lens having negative refractive power;
a third lens having refractive power;
a fourth lens having refractive power;
a fifth lens having refractive power with a convex object-side surface;
a sixth lens having positive refractive power with a convex object-side surface and a convex image-side surface; and
a seventh lens having negative refractive power,
wherein 6.0 mm$<f*\tan(\text{Semi-FOV})<$7.0 mm,
where f is a total effective focal length of the optical imaging lens assembly and Semi-FOV is half of a maximal field-of-view of the optical imaging lens assembly; and
wherein $2.3<(DT41+DT51+DT61+DT71)/(DT11+DT21+DT31)<2.8$,
where DT11 is a maximum effective radius of an object-side surface of the first lens, DT21 is a maximum effective radius of an object-side surface of the second lens, DT31 is a maximum effective radius of an object-side surface of the third lens, DT41 is a maximum effective radius of an object-side surface of the fourth lens, DT51 is a maximum effective radius of the object-side surface of the fifth lens, DT61 is a maximum effective radius of the object-side surface of the sixth lens, and DT71 is a maximum effective radius of an object-side surface of the seventh lens.

12. The optical imaging lens assembly according to claim 11, wherein $0.3<f1/(R1+R2)<1.1$,
where f1 is an effective focal length of the first lens, R1 is a radius of curvature of an object-side surface of the first lens, and R2 is a radius of curvature of an image-side surface of the first lens.

13. The optical imaging lens assembly according to claim 11, wherein $0.2<(f6+f7)/f<0.7$,
where f is the total effective focal length of the optical imaging lens assembly, f6 is an effective focal length of the sixth lens, and f7 is an effective focal length of the seventh lens.

14. The optical imaging lens assembly according to claim 11, wherein $1.7<(T56+CT6+T67+CT7)/TTL*5<2.2$,
where T56 is a spaced interval between the fifth lens and the sixth lens along the optical axis, CT6 is a center thickness of the sixth lens along the optical axis, T67 is a spaced interval between the sixth lens and the seventh lens along the optical axis, CT7 is a center thickness of the seventh lens along the optical axis, and TTL is a distance along the optical axis from an object-side surface of the first lens to an imaging plane of the optical imaging lens assembly.

15. The optical imaging lens assembly according to claim 11, wherein 40°<Semi-FOV<45°,
where Semi-FOV is half of the maximal field-of-view of the optical imaging lens assembly.

16. The optical imaging lens assembly according to claim 11, wherein $0.3<f/(R3+R4)<1.0$,
where f is the total effective focal length of the optical imaging lens assembly, R3 is a radius of curvature of an object-side surface of the second lens, and R4 is a radius of curvature of an image-side surface of the second lens.

17. The optical imaging lens assembly according to claim 11, wherein $0.8<f123/f<1.3$,
where f123 is a combined focal length of the first lens, the second lens and the third lens, and f is the total effective focal length of the optical imaging lens assembly.

18. The optical imaging lens assembly according to claim 11, wherein $1.6<|SAG51+SAG52|/CT5<2.6$,
where SAG51 is an on-axis distance from an intersection of the object-side surface of the fifth lens and the optical axis to a vertex of an effective radius of the object-side surface of the fifth lens, SAG52 is an on-axis distance from an intersection of an image-side surface of the fifth lens and the optical axis to a vertex of an effective radius of the image-side surface of the fifth lens, and CT5 is a center thickness of the fifth lens along the optical axis.

* * * * *